United States Patent [19]

Yamamoto et al.

[11] Patent Number: 5,491,594
[45] Date of Patent: Feb. 13, 1996

[54] MAGNETIC RECORDING/REPRODUCING APPARATUS

[75] Inventors: Tatsushi Yamamoto; Sigeaki Kakiwaki; Tohru Okuda; Hideo Okada, all of Nara; Masaji Tsuji, Yamatokouriyama; Takamitsu Tadera, Tenri; Akihito Yoshimoto, Yamatotakada, all of Japan

[73] Assignee: Sharp Kabushiki Kaisha, Osaka, Japan

[21] Appl. No.: 65,133

[22] Filed: May 20, 1993

[30] Foreign Application Priority Data

| May 21, 1992 | [JP] | Japan | 4-128603 |
|---|---|---|---|
| May 21, 1992 | [JP] | Japan | 4-128604 |
| May 21, 1992 | [JP] | Japan | 4-128605 |
| May 21, 1992 | [JP] | Japan | 4-128606 |
| Jun. 5, 1992 | [JP] | Japan | 4-145524 |
| Jul. 27, 1992 | [JP] | Japan | 4-199723 |

[51] Int. Cl.$^6$ .................................................. G11B 15/093
[52] U.S. Cl. ................................. 360/73.04; 360/71
[58] Field of Search ................... 360/73.04, 73.09, 360/73.11, 73.12, 73.13, 73.14, 73.01, 7174.1, 74.2, 74.3, 74.4

[56] References Cited

U.S. PATENT DOCUMENTS

| 3,984,868 | 10/1976 | Ragle et al. | 360/73.11 |
|---|---|---|---|
| 4,739,950 | 4/1988 | Goker et al. | |
| 5,012,989 | 5/1991 | Whyte, Jr. et al. | |
| 5,259,563 | 11/1993 | Kakiwaki et al. | 360/73.14 |
| 5,327,304 | 7/1994 | Owada et al. | 360/73.04 |

FOREIGN PATENT DOCUMENTS

| 0121144 | 10/1984 | European Pat. Off. |
|---|---|---|
| 3818360 | 12/1988 | Germany |
| 55-38688 | 3/1980 | Japan |
| 58-48220 | 3/1983 | Japan |
| 59-165983 | 9/1984 | Japan |
| 60-106015 | 6/1985 | Japan |
| 60-136803 | 7/1985 | Japan |
| 62-42105 | 3/1987 | Japan |
| 62-42104 | 3/1987 | Japan |
| 2083845 | 3/1990 | Japan |
| 2290175 | 11/1990 | Japan |
| 2-290175 | 11/1990 | Japan |
| 2089074 | 6/1992 | United Kingdom |

OTHER PUBLICATIONS

Chou et al., *IBM Technical Disclosure Bulletin*, 12(7):967–968 (1969).
"High Accuracy Control In Repetitive Driving of Proton Synchrotron Electromagnet Power Source"–Denki Gakkai Ronbun–Shi C, Jul. 20, 1980 (No English Translation).
"Consideration Of Disturbance Suppression In Control System Using Repetitive Learning Compensator and Proposal of Multiple Period Learning Compensator"–System and Control, vol. 31, No. 5, 1987 (No English Translation).

*Primary Examiner*—Georgia Y. Epps
*Assistant Examiner*—P. W. Huber
*Attorney, Agent, or Firm*—David G. Conlin; Milton Oliver

[57] ABSTRACT

A magnetic recording/reproducing apparatus compares speed information obtained by speed detecting means for a magnetic tape with a set travelling speed of the magnetic tape in a control circuit, and controls the rotational frequency of a driving motor for a take-up reel, thereby controlling constant-speed travelling of the magnetic tape, with employment of no capstan. According to this system, the overall apparatus can be simplified and miniaturized with reduction in weight and cost. Further, it is possible to improve constant-speed travelling performance of the magnetic tape by adjusting resonance and antiresonance appearing due to total equivalent inertia moment related to the magnetic tape and reels in the transfer characteristic of the control system.

11 Claims, 29 Drawing Sheets

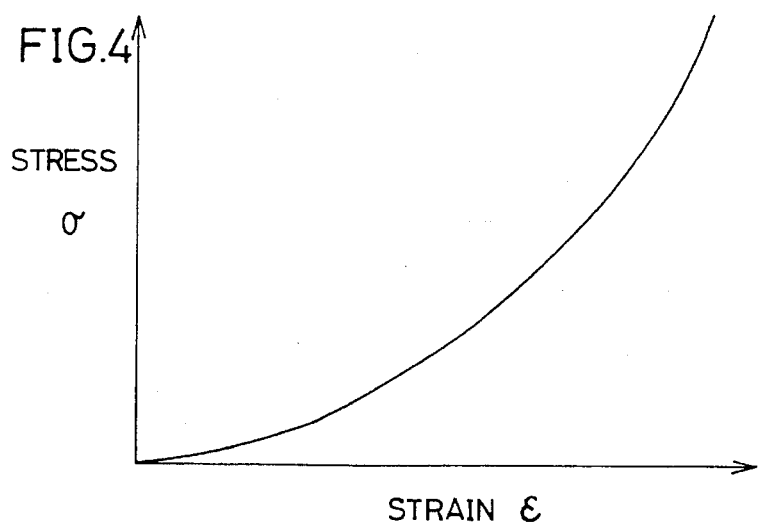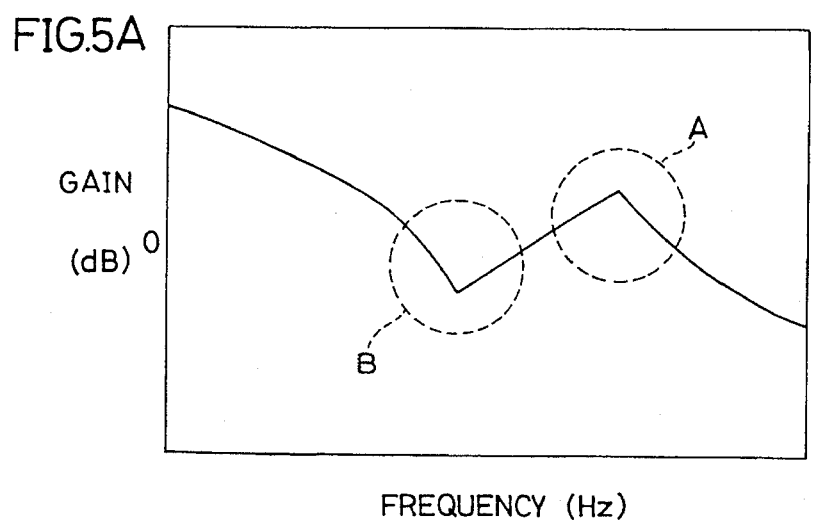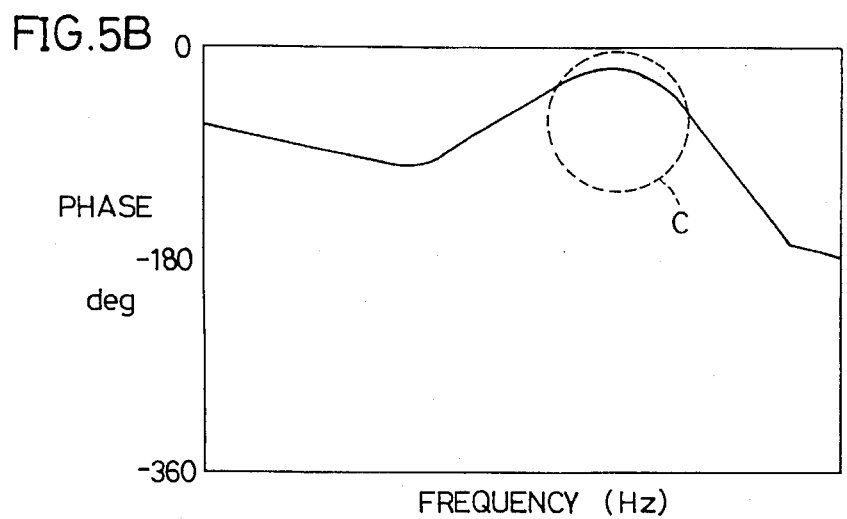

660μm          3.81mm

FIG.38
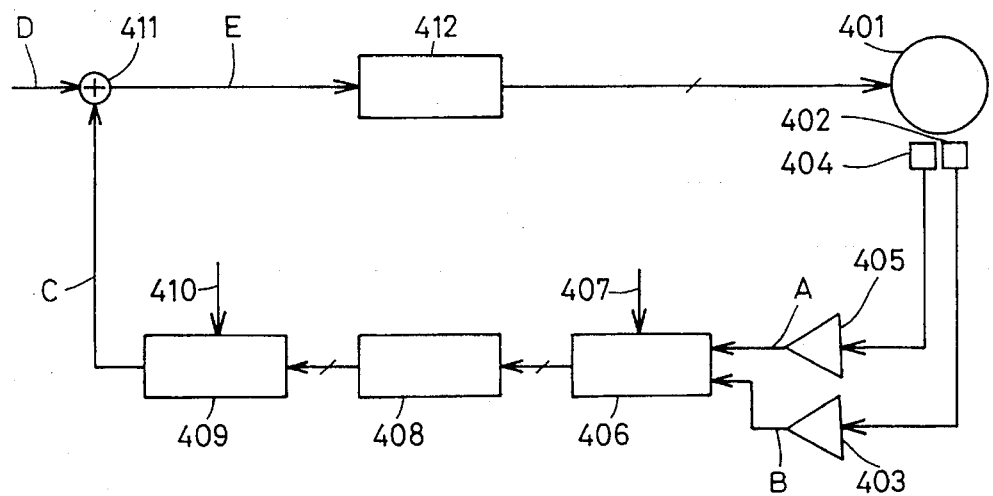
FIG.39A
PG SIGNAL B
FIG.39B
FG SIGNAL A
FIG.39C
RIPPLE
CORRECTION
SIGNAL
FIG.39D
SPEED
COMMAND
ADDER
OUTPUT
FIG.39E
MOTOR
TORQUE
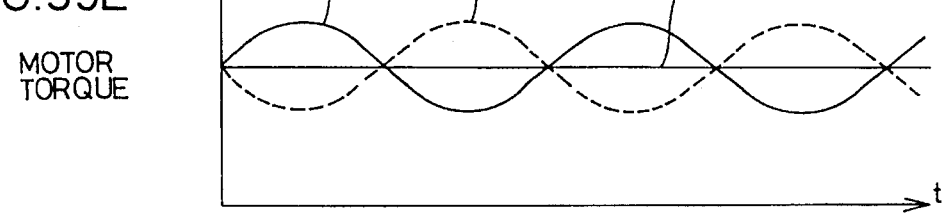

MOTOR TORQUE

RIPPLE CORRECTION SIGNAL

RIPPLE CORRECTION SIGNAL

ROTOR MAGNET

STATOR DRIVING COIL

5,491,594

MAGNETIC RECORDING/REPRODUCING APPARATUS

BACKGROUND OF THE INVENTION

1. Field of the Invention

The present invention relates to a magnetic recording/reproducing apparatus such as an audio tape deck employing a magnetic tape as a magnetic recording medium, and more particularly, it relates to a magnetic recording/reproducing apparatus using no capstan for conserving the travelling speed of a magnetic tape.

2. Description of the Background Art

In general, a magnetic recording/reproducing apparatus employing a magnetic tape implements constant-speed travelling of the magnetic tape by holding the tape with a capstan and a pinch roller which is pressed against the same and rotating the capstan at a constant speed.

The roll radius of such a magnetic tape which is taken up on a reel changes with time, whereby the rotational speed of the reel also changes with time when the magnetic tape travels at a constant speed. If a single drive motor is adapted to rotate/drive both of a capstan shaft for driving the magnetic tape at a constant speed and a reel shaft for taking up the magnetic tape as received on the reel, therefore, the reel shaft driving system must include a slip mechanism.

In addition to the function of driving the magnetic tape at a constant speed, a function of rotating the reel at a high speed is also required for fast-forwarding or rewinding the magnetic tape. In order to implement such functions with a single drive motor, therefore, it is necessary to switch the speed reduction factor from the drive motor to the reel system between operations for driving the magnetic tape at constant and high speeds, and hence the mechanism is complicated.

The aforementioned conventional magnetic recording/reproducing apparatus for driving the magnetic tape at a constant speed with the capstan further has the following problems:

In such a magnetic recording/reproducing apparatus, it is necessary to drive the magnetic tape at a constant speed with the so-called wow and flutter value of about 0.3% in recording/reproduction, while driving the magnetic tape at a speed of several to several 10 times that in recording/reproduction in high-speed travelling of the magnetic tape.

In order to enable reciprocation of the magnetic tape with the so-called auto-reverse function, on the other hand, a capstan, a pinch roller and the like are required for forwarding and reversing the magnetic tape respectively, with further requirement for a switching mechanism for reproduction, fast forward and rewind modes. Thus, the conventional magnetic recording/reproducing apparatus is provided with a complicated mechanism which is formed by an extremely large number of components, and inhibited from reduction in weight and cost of the driving system.

A motor rotational speed control technique employed in a conventional magnetic recording/reproducing apparatus or the like is now described with reference to FIG. 48. FIG. 48 is a block diagram showing an exemplary motor rotational speed control circuit for controlling a motor rotational speed with control information from an FG (frequency generator) or a PG (pulse generator) mounted on a motor. The conventional motor rotational speed control circuit shown in FIG. 48 comprises a motor 401 such as that shown in FIG. 49A or 49B, for example, an FG 404 for detecting the rotational speed of the motor 401, an FG waveform shaping circuit 405, an F-V converter 480 for converting speed information to a voltage value, a comparison operator 481 for outputting an amount of error between a target speed and the output of the F-V converter 480, a characteristic setting circuit 482 for setting a gain of the operator output and an amount of phase compensation, and a driving circuit 412 which receives a speed command signal D for driving the motor 401. The FG 404 is waveform-shaped by the FG waveform shaping circuit 405. Thereafter the as-obtained FG signal is inputted in the F-V converter 480, to be converted to a voltage level. This FG level signal is compared with the target value, to form error information. This error information is subjected to setting of a servo gain and an amount of phase compensation by the characteristic setting circuit 482 and forms a speed command signal D, which in turn is inputted in the motor driving circuit 412 for controlling the rotational frequency of the motor 401.

Japanese Patent Laying-Open Nos. 59-165983 (1984) and 2-290175 (1990) describe examples of conventional techniques of correcting/controlling irregular rotation. The technique disclosed in Japanese Patent Laying-Open No. 59-165983 is adapted to access correction data in response to outputs of position and speed detectors which are mounted on a motor, thereby controlling the gain of a speed control system. On the other hand, the technique disclosed in Japanese Patent Laying-Open No. 2-290175 is adapted to extract a set frequency component from irregular rotation components and produce a sine wave which is identical in phase and level to this frequency component for mixing the same to a driving circuit reference signal.

In the aforementioned conventional correction techniques, however, that for controlling the gain of the speed control system by the correction data has such a problem that it is difficult to produce and measure the correction data. In the method of extracting a prescribed frequency component from irregular torque components for producing a sine wave which is identical in phase and amplitude to this component and inputting the same in a motor driving circuit, on the other hand, correction circuits of the same number as components are required in order to correct a plurality of components, while a circuit for synchronizing frequencies is inevitably required when the motor rotational speed fluctuates, although this technique is capable of moving/setting the phase and the amplitude. Thus, the circuit scale as well as the number of adjusted portions may be increased.

SUMMARY OF THE INVENTION

An object of the present invention is to provide a magnetic recording/reproducing apparatus which can implement constant-speed travelling of a magnetic tape with an extremely small number of components including no capstan etc. by detecting a tape speed and controlling a reel rotational speed on the basis of this information.

Another object of the present invention is to provide a magnetic recording/reproducing apparatus having a motor rotational speed control unit which can relatively simply obtain smooth rotation of a motor in high accuracy.

A magnetic recording/reproducing apparatus according to a first aspect of the present invention comprises speed detecting means for a travelling magnetic tape, reel driving means for a take-up reel, and control means for controlling the rotational speed of a reel drive motor for the take-up reel on the basis of speed information obtained by the tape speed detecting means. The control means is adapted to control the rotational speed of the reel drive motor for the take-up reel, thereby controlling the travelling speed of the magnetic tape.

The feature of this magnetic recording/reproducing apparatus resides in that the frequency of resonance appearing due to total equivalent inertia moment related to the magnetic tape and the take-up reel and that related to a supply reel is higher than or nearly equal to the frequency of antiresonance appearing due to total equivalent inertial moment related to the magnetic tape and the supply reel between a start and an end of an operation for winding the magnetic tape on the take-up reel in recording/reproduction.

Such relation between the frequencies of resonance and antiresonance is implemented by preparing such a structure that the following relation holds between the start and the end of the operation for winding the magnetic tape on the take-up reel in recording/reproduction:

$$K_S \cdot R_S^2/J_S \leq K_S \cdot K_T/(K_S+K_T) \cdot (R_S^2/J_S + R_T^2/J_T)$$

where respective symbols represent the following values:

$J_T$: equivalent inertia moment of the take-up reel drive motor, speed reduction means driven by the take-up reel drive motor, a take-up reel base, the take-up reel, and a magnetic tape roll, which is wound on the take-up reel, about the rotation axis of the take-up reel $R_T$: roll radius of the magnetic tape wound on the take-up reel $K_T$: longitudinal spring constant of a portion of the magnetic tape located between a contact surface with a magnetic head and the take-up reel $J_S$: equivalent inertia moment of a supply reel base, the supply reel and a magnetic tape roll wound on the supply reel about the rotation axis of the supply reel $R_S$: roll radius of the magnetic tape wound on the supply reel $K_S$: longitudinal spring constant of a portion of the magnetic tape located between the contact surface with the magnetic head and the supply reel According to the aforementioned structure, a phase lag in transfer characteristic of the control system is reduced due to the aforementioned relation between the resonance and antiresonance frequencies, whereby a servo band is widened and constant-speed travelling performance of the magnetic tape is improved with suppression of wow and flutter.

In a preferred embodiment of the present invention, the reel driving means includes a speed reduction mechanism, and a motor for rotating/driving the take-up reel through the speed reduction mechanism.

The tape speed detecting means provides recording and reproducing gaps on upstream and downstream sides of the travelling direction of the magnetic tape respectively at a prescribed distance to measure a time required for recording a speed detection signal in the magnetic tape with the recording gap and detecting the signal with the reproducing gap, thereby calculating the tape speed on the basis of the result of the measurement.

While the aforementioned recording and reproducing gaps can be formed in different magnetic heads, it is possible to detect the travelling speed of the magnetic tape with a single magnetic head by providing such gaps in the same magnetic head. When the recording and reproducing gaps are provided in the same magnetic head, two equivalent magnetic gaps are provided in this magnetic head, and recording and reproducing circuits are so switched that one of the magnetic gaps serves as a recording gap and the other one serves as a reproducing gap in response to the travelling direction of the magnetic tape.

The tape speed detecting means can be prepared by combining a roller which comes into contact with the magnetic tape to be rotated along travelling of the magnetic tape, means for detecting the rotational speed of this roller, and means for calculating the travelling speed of the magnetic tape from the rotational speed of the roller.

Such tape speed detecting means for detecting the rotational speed of the roller which is rotated in contact with the magnetic tape preferably further includes means for detecting the rotational speed of a reel on which the tape is wound, to calculate the magnetic tape travelling speed from both of the rotational speed information of the roller and that of the reel. According to this system, the travelling speed of the magnetic tape is calculated on the basis of both of the rotational speed information of the roller which is in high accuracy in a low frequency region and that of the reel which is in high accuracy in a high frequency region, whereby it is possible to accurately detect both of an average correct magnetic tape travelling speed and change of the magnetic tape travelling speed in the so-called wow and flutter region, i.e., in a high frequency region.

The speed reduction mechanism provided in the reel driving means preferably includes a discoidal member being mounted on a rotation axis of the take-up reel and means for frictionally transmitting rotational driving force of the motor to the discoidal member. Due to such friction transmitting means of the speed reduction mechanism, the motor can be increased in rotational speed as compared with a direct drive system, to be used in the vicinity of an efficient rotational speed. Thus, it is possible to reduce power consumption, as well as to shift influence exerted by a ripple to a high frequency region. As a result of the effect, the fluctuation of the transmitting torque is reduced and suitable reduction in driving mechanism is realized by means of the simple structure, whereby wow and flutter can be reduced.

In an another preferred embodiment of the present invention, the speed reduction mechanism provided in the reel driving means includes a worm gear. Due to such employment of a worm gear, it is possible to obtain a large speed reduction ratio in single-stage speed reduction, and further, the worm gear operates in a state regularly engaging with a worm wheel dissimilarly to an intermittently engaging spur gear, whereby it is possible to reduce wow and flutter.

According to the present invention, the control means for controlling the rotational speed of the reel drive motor includes a motor rotational speed control circuit, which comprises m (m: integer of at least 1) rotational position detectors and m by n (n: integer of at least 2) rotational speed detectors in rotation. This motor rotational speed control circuit further comprises memory means storing a single type of sine wave or a composite wave made by adding up a plurality of sine waves having a frequency of integral times the motor rotational frequency as ripple correction data, address means for obtaining a rotational speed detector address signal whose start address can be arbitrarily set by the rotational position detectors and the rotational speed detectors, and gain means for setting the amplitude of the ripple correction data and outputting a ripple correction signal. Due to this structure, the sine wave for serving as ripple correction data corresponding to the rotational speed detector address signal obtained from the address means is read from the memory means to be inputted in the gain means thereby producing a ripple correction signal with a set amplitude and adding this ripple correction signal to the control signal for controlling the rotational speed.

Due to provision of the control means including such a motor rotational speed control circuit, it is possible to output a ripple correction signal for correcting an irregular torque component which is generated at frequencies integral times the motor rotation frequency, thereby reducing irregular rotation.

A magnetic recording/reproducing apparatus according to another aspect of the present invention comprises tape speed detecting means for detecting the travelling speed of a magnetic tape, reel driving means for driving a reel on which the magnetic tape is wound, control means for controlling the reel driving means on the basis of tape speed information detected by the tape speed detection means, and rotation detecting means for detecting the rotational speed of the reel driving means. The control means includes a learning compensator for learning a periodic speed error and adding the same to a next period in a feed forward manner. A delay time of the learning compensator is rendered variable in response to the output value of the rotation detecting means.

According to the aforementioned structure, it is possible to remarkably reduce a torque ripple of a reel motor which causes wow and flutter. Therefore, it is possible to enable constant-speed control of magnetic tape travelling with extremely small wow and flutter by a reel motor having an extremely small number of components including no capstan, pinch roller, slip mechanism and the like which have been required for a conventional mechanism.

A magnetic recording/reproducing apparatus according to still another aspect of the present invention comprises tape speed detecting means for detecting the travelling speed of a magnetic tape, reel driving means for driving a reel on which the magnetic tape is wound, rotation detecting means for detecting the rotational speed of the reel driving means, and control means for controlling the reel driving means for driving the tape at a constant speed. The control means includes a first control system for controlling a low frequency band by feeding back tape speed information detected by the tape speed detecting means and a second control system for controlling a high frequency band by feeding back rotation information of the reel driving means detected by the rotation detecting means.

According to the aforementioned structure, double feedback control is carried out with the first control system for controlling a low frequency band in high accuracy and the second control system for controlling a high frequency band in high accuracy, whereby the magnetic tape can be driven at a constant speed in high accuracy in both of low and high frequency bands. Further, the band to be subjected to feedback control is divided into low and high frequency bands to be shared by the first and second control systems, whereby the tape speed detecting means may simply have a roller which detects the speed in high accuracy only in the low frequency band, for example. Thus, it is possible to simplify and miniaturize the speed detecting roller with reduction in cost.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a stress-strain diagram of a magnetic tape in the magnetic recording/reproducing apparatus according to the first embodiment of the present invention;

FIG. 5A is a transfer characteristic diagram showing relation between frequencies and gains appearing when resonance is higher in frequency than antiresonance and the frequency difference is larger than that shown in FIG. 3A, and FIG. 5B is a transfer characteristic diagram showing relation between frequencies and phases;

FIG. 38 is a block diagram showing a magnetic recording/reproducing apparatus according to a seventeenth embodiment of the present invention;

FIGS. 39A, 39B, 39C, 39D and 39E illustrate fluctuation states of a PG signal, an FG signal, a ripple correction signal, a speed command and addition output signal and motor torque in the magnetic recording/reproducing apparatus shown in FIG. 38 respectively;

DESCRIPTION OF THE PREFERRED EMBODIMENTS

A first embodiment of the present invention is now described with reference to FIGS. 1 to 5.

Figure 1:
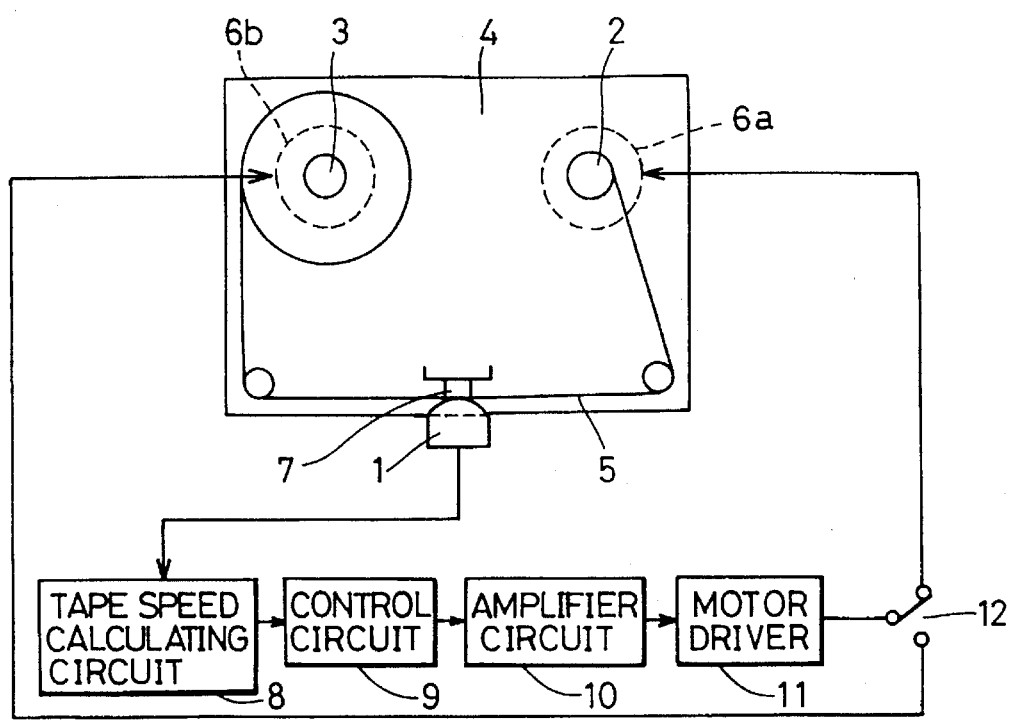
FIG. 1 schematically illustrates the structure of a magnetic recording/reproducing apparatus according to a first embodiment of the present invention.

In a magnetic recording/reproducing apparatus according to the first embodiment of the present invention, a magnetic head is employed as means for detecting the speed of a magnetic tape, while reel driving means is adapted to directly drive a reel by a motor through no speed reduction gear. Referring to FIG. 1, a take-up reel drive motor 6a is driven to directly rotate a take-up reel 2, so that a magnetic tape 5 wound on a supply reel 3 travels to be taken up by the take-up reel 2. At this time, a reel drive motor 6b for directly driving the supply reel 3 is not controlled but freely rotatable. A tape speed detecting signal for the magnetic tape 5 obtained from a magnetic head 1 is inputted in a tape speed calculating circuit 8, signal-processed and then inputted in a control circuit 9. The control circuit 9 compares the as-detected speed signal of the magnetic tape 5 with a previously set travelling speed thereof, i.e., a target speed, and the as-obtained control signal is amplified by an amplifier circuit 10. The amplified control signal is inputted in the reel drive motor 6a through a motor driver 11, to control the rotational speed thereof. A switch 12 is adapted to input the control signal outputted from the motor driver 11 in either one of the reel drive motors 6a and 6b, thereby implementing bidirectional travelling of the magnetic tape 5. Fast forward and rewind operations of the magnetic tape 5 are implemented by rotating the reel drive motor 6a or 6b at a high speed.

A magnetic recording/reproducing apparatus such as that according to this embodiment, which detects the travelling speed of a magnetic tape and directly controls the rotational speed of a take-up reel drive motor on the basis of the speed information thereby implementing constant-speed travelling of the magnetic tape, is provided with antiresonance caused by total equivalent inertia moment related to the magnetic tape and a supply reel, and resonance caused by total equivalent inertia moment related to the magnetic tape and a take-up reel and that related to the supply reel.

Figure 2A:
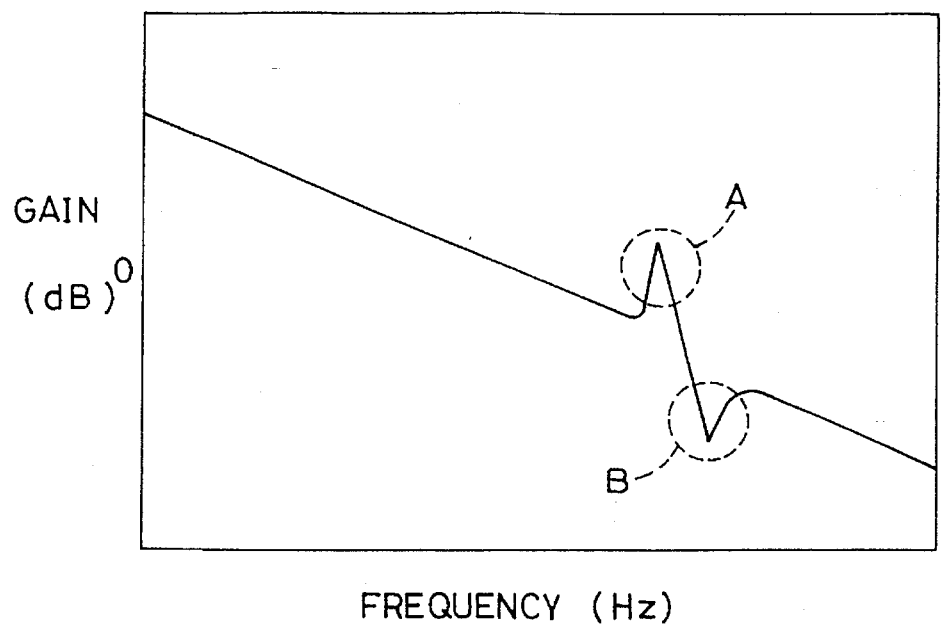
FIG. 2A is a transfer characteristic diagram of a control system showing relation between frequencies and gains appearing when resonance is higher in frequency than antiresonance.
Figure 2B:
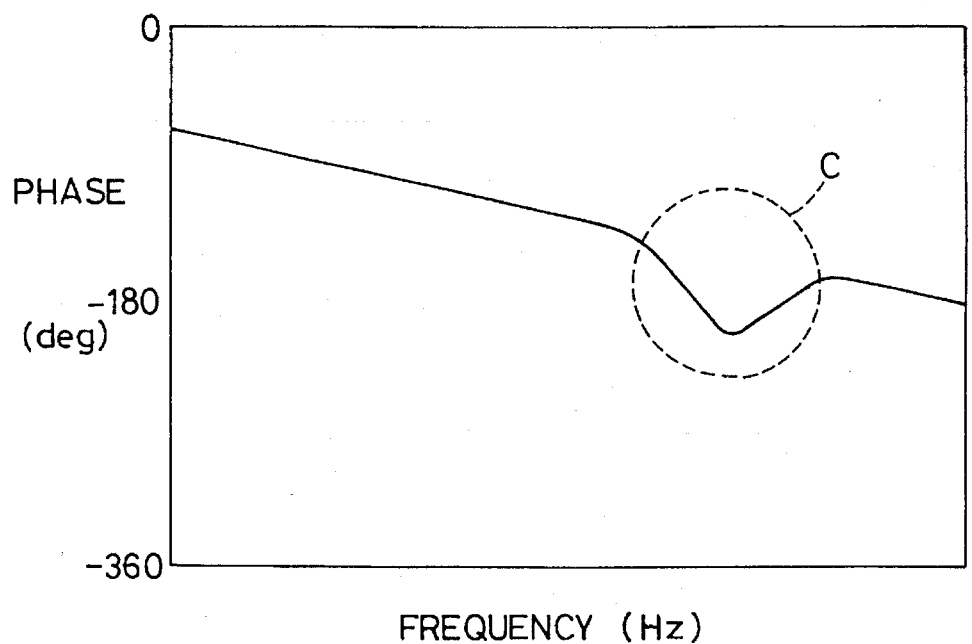
FIG. 2B is a transfer characteristic diagram showing relation between frequencies and phases in the control system having the transfer characteristics shown in FIG. 2A.

When such antiresonance (B in FIG. 2A) is higher in frequency than the resonance (A in FIG. 2A) as shown in FIG. 2A in transfer characteristics of the control system provided in the magnetic recording/reproducing apparatus shown in FIG. 1, an abrupt phase lag takes place in the vicinity of the resonance frequency, as shown by C in FIG. 2B. Due to such an abrupt phase lag, it is necessary to limit a servo band in order to ensure stability of the control system, leading to deterioration of constant speed travelling performance of the magnetic tape, i.e., resistance against wow and flutter.

Figure 3A:
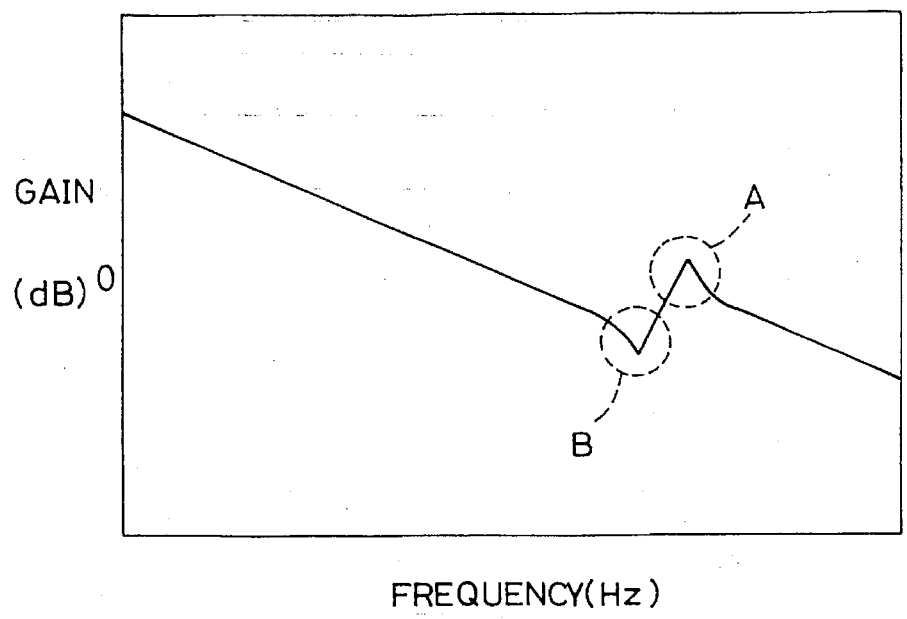
FIG. 3A is a transfer characteristic diagram of the control system in the first embodiment of the present invention showing relation between frequencies and gains.
Figure 3B:
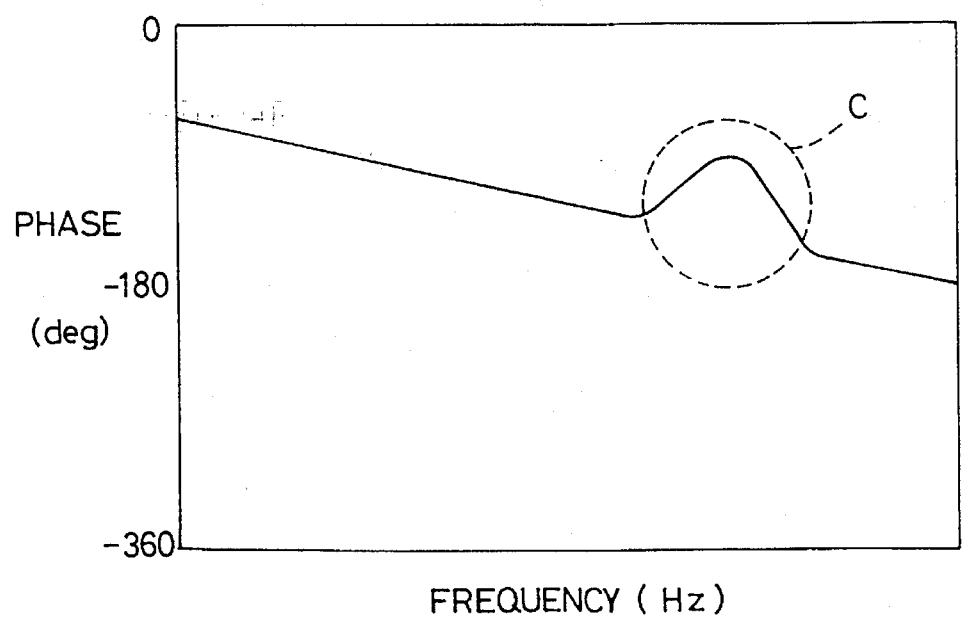
FIG. 3B is a transfer characteristic diagram showing relation between frequencies and phases.

When the control system of the magnetic recording/reproducing apparatus shown in FIG. 1 is so structured that the resonance A is higher in frequency than the antiresonance B as shown in FIG. 3A, on the other hand, the phase leads in the vicinity of the antiresonance frequency as shown in FIG. 3B, whereby the servo band may not be limited in order to ensure stability of the control system but can be improved. Consequently, it is possible to improve constant speed travelling performance of the magnetic tape, i.e., resistance against wow and flutter.

When the coefficient of viscosity of the system is large, the phase lag is not abrupt but gentle even if the antiresonance is higher in frequency by 30–40% than the resonance. In such case, the servo system is stable and the wow and flutter characteristic is never badly affected. However, in case the ratio of the resonance to the antiresonance in frequency is too high, the servo system's performance becomes bad because of large gain reduction near antiresonance frequency area. Accordingly, the stabilization and the high performance of the servo system can be realized by making the frequency of the resonance higher than or nearly equal (within the above described range) to that of the antiresonance.

The frequencies of the resonance and antiresonance are determined by the total equivalent inertia moment values related to the reels, roll diameters of the magnetic tape wound on the reels, and longitudinal spring constants of the magnetic tape. The antiresonance frequency is a natural resonance frequency of a portion of the magnetic tape located between a sliding contact surface with the magnetic head and the supply reel and equivalent inertia moment of a rotor, which is rotated in engagement with the supply reel, about the rotation axis of the supply reel. The resonance frequency is natural resonance frequency of a portion of the magnetic tape located between the sliding contact surface with the magnetic head and the take-up reel, the portion of the magnetic tape located between the sliding contact surface with the magnetic head and the supply reel, equivalent inertia moment of a rotor, which is rotated in engagement with the take-up reel, about the rotation axis of the take-up reel, and the equivalent inertia moment of the rotor, which is rotated in engagement with the supply reel, about the rotation axis of the supply reel.

In the magnetic recording/reproducing apparatus according to the first embodiment shown in FIG. 1, the portion of the magnetic tape 5 located between the sliding contact surface with the magnetic head 1 and the supply reel 3 has the following spring constant $K_S$:

$$K_S = E_S \cdot W \cdot D / L_S \text{ (gf/cm)}$$

where respective symbols represent the following values:
$L_S$: length of the portion of the magnetic tape 5 located between the sliding contact surface with the magnetic head 1 and the supply reel 3
$E_S$: Young's modulus of this portion of the magnetic tape 5
W: width of this portion of the magnetic tape 5
D: thickness of this portion of the magnetic tape 5
Similarly, the portion of the magnetic tape 5 located between the sliding contact surface with the magnetic head 1 and the take-up reel 2 has the following spring constant $K_T$:

$$K_T = E_T \cdot W \cdot D / L_T \text{ (gf/cm)}$$

where respective symbols represent the following values:
$L_T$: length of the portion of the magnetic tape 5 located between the sliding contact surface with the magnetic head 1 and the take-up reel 2
$E_T$: Young's modulus of this portion of the magnetic tape 5
The magnetic tape 5 has different Young's moduli $E_S$ and $E_T$ since the same is a nonlinear elastic body having stress-strain relation shown in FIG. 4 with different tape tension levels in the portions between the sliding contact surface with the magnetic head 1 and the take-up reel 2 and between this sliding contact surface and the supply reel 3.

On the other hand, total equivalent inertia moment $J_S$ about the rotation axis of the supply reel 3 is as follows:

$$J_S = J_{RS} + J_{MS} + J_{TS} \text{ (gf.cm.}S^2\text{)}$$

where respective symbols represent the following values:
$J_{RS}$: total inertia moment of the supply reel 3 and a supply reel base
$J_{MS}$: inertia moment of a roller of the supply reel drive motor 6b
$J_{TS}$: inertia moment of a roll of the magnetic tape 5 wound on the supply reel 3
Similarly, total equivalent inertia moment $J_T$ about the rotation axis of the take-up reel 2 is as follows:

$$J_T = J_{RT} + J_{MT} + J_{TT} \text{ (gf.cm.}S^2\text{)}$$

where respective symbols represent the following values:
$J_{RT}$: total inertia moment of the take-up reel 2 and a take-up reel base
$J_{MT}$: inertia moment of a roller of the take-up reel drive motor 6a
$J_{TT}$: inertia moment of a roll of the magnetic tape 5 wound on the take-up reel 2
When a speed reduction mechanism is provided between each reel drive motor and each reel, however, a speed reduction ratio must be taken into consideration as to the inertia moment of the roller of the motor, while it is also necessary to take inertia moment of speed reduction means driven by the motor into consideration.

Hence, the aforementioned antiresonance frequency $f_s$ is as follows:

$$f_s = 1/(2\pi) \cdot (K_S \cdot R_S^2 / J_S)^{1/2} \text{ (Hz)}$$

where $R_S$ represents the radius of the roll of the magnetic tape 5 wound on the supply reel 3, while the aforementioned resonance frequency $f_T$ is as follows:

$$f_T = 1/(2\pi) \cdot [K_S \cdot K_T / (K_S + K_T) \cdot (R_S^2 / J_S + R_T^2 / J_T)]^{1/2} \text{ (Hz)}$$

where $R_T$ represents the radius of the roll of the magnetic tape 5 wound on the take-up reel 2. Thus, it is understood that the respective elements may be formed to satisfy the following relation:

$$K_S \cdot R_S^2/J_S \leqq K_S \cdot K_T/(K_S+K_T) \cdot (R_S^2/J_S+R_T^2/J_T)$$

so that the resonance is regularly higher in frequency than the antiresonance between a start and an end of an operation for winding the magnetic tape 5 on the take-up reel 2 in recording/reproduction.

FIGS. 5A and 5B illustrate transfer characteristics appearing when the resonance is higher in frequency than the antiresonance with large frequency difference. In this case, the gain is so remarkably lost in the antiresonance that it is difficult to extremely improve the constant-speed travelling performance of the magnetic tape. In order to greatly improve the constant-speed travelling performance of a magnetic tape, therefore, it is preferable to make the resonance higher in frequency than the antiresonance as well as to minimize the frequency difference.

As hereinabove described, the magnetic recording/reproducing apparatus according to this embodiment is so formed that the frequency of the resonance appearing due to the total equivalent inertia moment related to the magnetic tape and the take-up reel and that related to the supply reel is higher than or nearly equal to (including several 10% lower, as mentioned, than) that of the antiresonance appearing due to the total equivalent inertia moment related to the magnetic tape and the supply reel, whereby it is possible to prevent an abrupt phase lag in transfer characteristics of the control system for ensuring stability thereof. Further, the servo band is so improved that it is possible to implement constant-speed travelling of the magnetic tape by a reel driving system employing no capstans etc.

A second embodiment of the present invention is now described with reference to FIGS. 6 to 11A and 11B.

Figure 6:
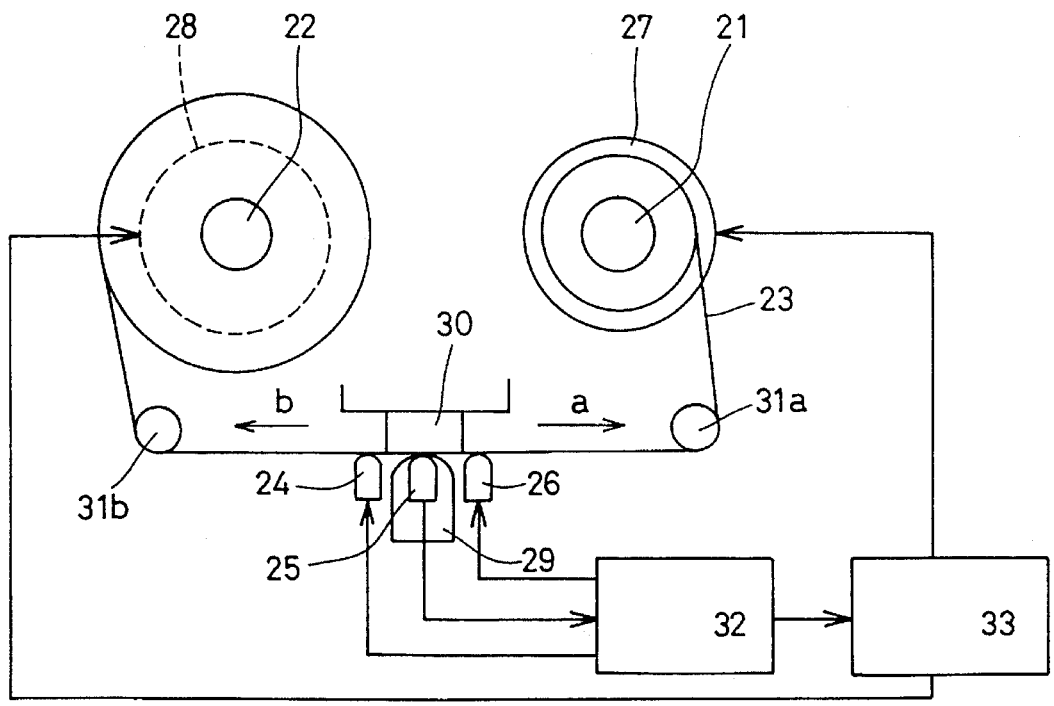
FIG. 6 schematically illustrates the structure of a magnetic recording/reproducing apparatus according to a second embodiment of the present invention.

In a magnetic recording/reproducing apparatus according to the second embodiment of the present invention, magnetic heads 24, 25 and 26 are in contact with a magnetic tape 23 which travels in response to rotation/driving of feed and take-up reels 21 and 22, as shown in FIG. 6. The magnetic heads 24 and 26 can be switched between recording and erasing as tape speed detecting heads, while the magnetic head 25 serves as a reproducing head which is employed for detecting the tape speed. The reels 21 and 22 are driven by reel drive motors 27 and 28 respectively.

The magnetic recording/reproducing apparatus according to this embodiment further comprises a magnetic head 29 for recording/reproducing information, a pressure pad 30, and rollers 31a and 31b provided in a cassette. The apparatus is further provided with a tape speed calculating circuit 32 which controls the speed detecting magnetic heads 24, 25 and 26 and calculates the tape speed on the basis of signals from these magnetic heads 24, 25 and 26. In addition, a control circuit 33 is adapted to control the reel drive motors 27 and 28 on the basis of a signal from the tape speed calculating circuit 32.

Description is now made in detail on an operation of this system, which is carried out when the magnetic tape 23 travels along arrow a in FIG. 6 in recording/reproduction. The supply reel drive motor 28 is not energized in this case, whereby the magnetic tape 23 can be drawn out from the supply reel 22 substantially with no load. As described later, a signal such as a pulse wave, for example, is recorded on, reproduced from and erased from the magnetic tape 23 through the magnetic heads 24 and 26 for detecting the tape speed, the reproducing head 25 for detecting the tape speed and the tape speed calculating circuit 32, and a time required from recording to reproduction of the signal is measured for calculating the tape speed. The result is inputted in the control circuit 33, which in turn compares the as detected tape speed with a prescribed tape speed, to carry out an operation. Then the control circuit 33 transmits a control signal to the take-up reel drive motor 27 to attain a prescribed tape speed. The reel drive motor 27 drives the reel 21 in response to the control signal, to take up the magnetic tape 23 thereon. Thus, the magnetic tape 23 travels along arrow a in FIG. 6 at the prescribed tape speed, so that the magnetic head 29 for recording/reproducing information such as music, a sound signal or digitalized information can record or reproduce the information on or from the magnetic tape 23 which is pressed by the pressure pad 30.

Description is now made on an operation which is carried out when the magnetic tape 23 travels along arrow b in FIG. 6. The supply reel drive motor 27 is not energized this time similarly to the above, whereby the magnetic tape 23 can be drawn out from the supply reel 21 substantially with no load. Similarly to the aforementioned travelling along arrow a, the tape speed is calculated through the magnetic heads 24 and 26 for detecting the tape speed, the reproducing head 25 for detecting the tape speed and the tape speed calculating circuit 32. The result is inputted in the control circuit 33, which in turn compares the as-detected tape speed with the prescribed tape speed to carry out an operation, and transmits a control signal to the take-up reel drive motor 28 to attain the prescribed tape speed. The reel drive motor 28 drives the reel 22 in response to the control signal, to take up the magnetic tape 23 thereon. Thus, the magnetic tape 23 travels at the prescribed tape speed, so that the magnetic head 29 for recording/reproducing information records or reproduces information on or from the magnetic tape 23 which is pressed by the pressure pad 30.

A fast forward operation of the magnetic tape 23 is now described. In this case, the take-up reel drive motor (27 for the reel 21 or 28 for the reel 22) is increased in rotational speed, while the other reel drive motor is not energized. Thus, the magnetic tape 23 is forwarded at a higher speed than that in recording or reproduction. At this time, the magnetic head 29 for recording/reproducing information and the magnetic heads 24, 25 and 26 for detecting the tape speed may be moved to positions for allowing free travelling of the magnetic tape 23, to be prevented from wear while reducing loads on the reel drive motors 27 and 28.

Figure 7:
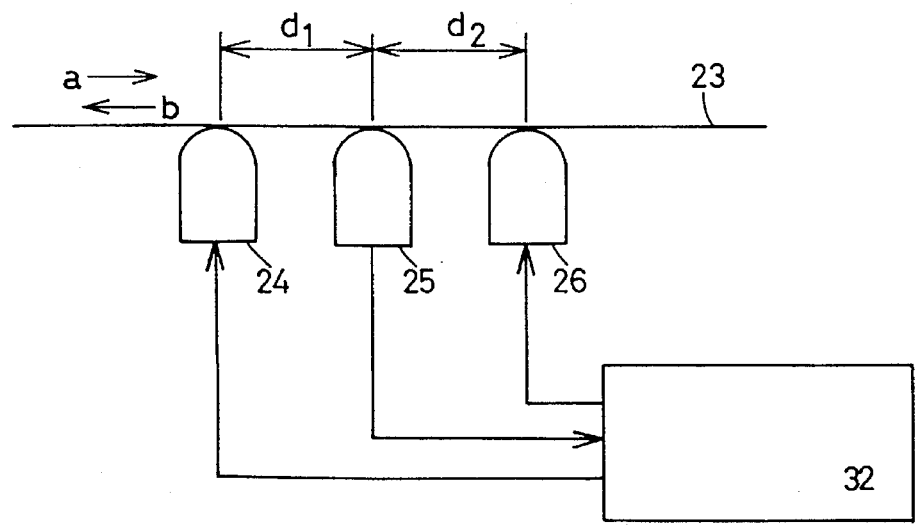
FIG. 7 illustrates a tape speed detecting part of the magnetic recording/reproducing apparatus shown in FIG. 6 in an enlarged manner.

Detection of the tape speed is now described with reference to FIG. 7. FIG. 7 illustrates only a tape speed detecting portion of the apparatus shown in FIG. 6 in an enlarged manner. The magnetic heads 24 and 26 and the reproducing head 25 for detecting the tape speed are arranged to be flush with each other along the direction of tape width with prescribed gap distances $d_1$ and $d_2$ between the magnetic head 24 and the reproducing head 25 and between the reproducing head 25 and the magnetic head 26, so that the tape speed detecting signal can be recorded on, reproduced from and erased from the same track of the magnetic tape 23.

An operation for detecting the tape speed which is carried out when the magnetic tape 23 travels along arrow a in FIG. 7 is now described. The magnetic head 24 serves as a recording head, to write a signal such as a pulse wave received from the tape speed calculating circuit 32 on the magnetic tape 23. This signal is reproduced by the reproducing head 25 for detecting the tape speed, and inputted in the tape speed calculating circuit 32. The tape speed calculating circuit 32 measures a time $t_1$ from transmission of the signal to the magnetic head 24 to reproduction of this signal by the magnetic head 25, and calculates a tape speed $v_1$ ($=d_1/t_1$) from the result of the measurement and the gap distance $d_1$ between the magnetic head 24 and the reproducing head 25. The signal written on the magnetic tape 23 for detecting the tape speed is erased by the magnetic head 26 serving as an erasing head.

When the magnetic tape 23 travels along arrow b in FIG. 7, on the other hand, the magnetic head 26 serves as a recording head to write a pulse wave on the magnetic tape 23, so that this signal is reproduced by the reproducing head 25. The tape speed calculating circuit 32 measure a time $t_2$ from recording of the tape speed detection signal on the magnetic tape 23 to reproduction thereof, and calculates a tape speed $v_2$ ($=d_2/t_2$) from the gap distance $d_2$ between the magnetic head 26 and the reproducing head 25. The signal written on the magnetic tape 23 for detecting the tape speed is erased by the magnetic head 24 serving as an erasing head.

Figure 8:
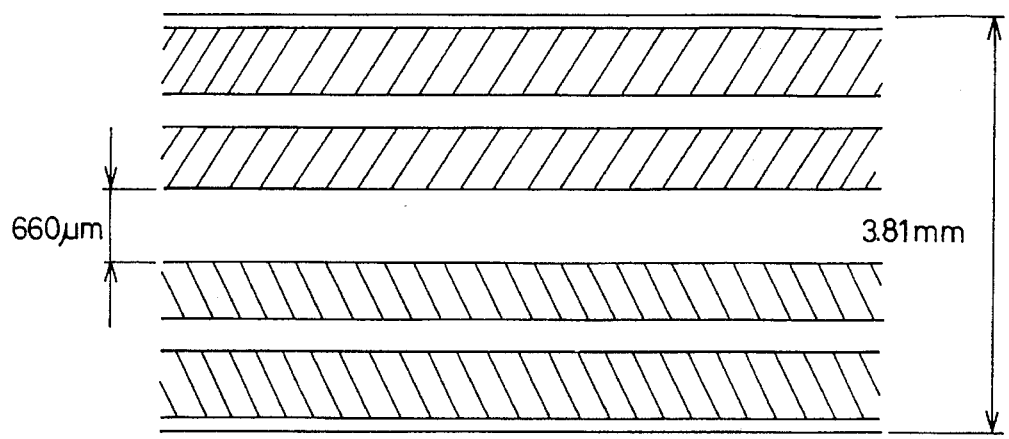
FIG. 8 illustrates a track format of a magnetic tape provided in a compact cassette.

At this time, the tape speed detecting signal is written on and erased from the magnetic tape 23. A tape speed detecting track which is supplied with this tape speed detecting signal is provided in a portion other than data tracks for recording information, as shown in FIG. 8. FIG. 8 illustrates a magnetic tape which is employed in a compact cassette of a two-channel reciprocation system. Referring to FIG. 8, slanted portions show data tracks which are employed for recording information. This magnetic tape is provided in its cross-directional center with a portion of 660 μm which is not employed for recording information. When this portion is adapted to detect the tape speed, the information recorded in the data tracks is not erased. Therefore, it is possible to reproduce information which is recorded in a tape cassette through a conventional capstan system mechanism, by adjusting the tape speed and the format of the magnetic head 29 for recording/reproducing information. On the other hand, it is also possible to reproduce information, which is recorded in the magnetic recording/reproducing apparatus according to this embodiment, by a conventional capstan system mechanism.

Figure 9A:
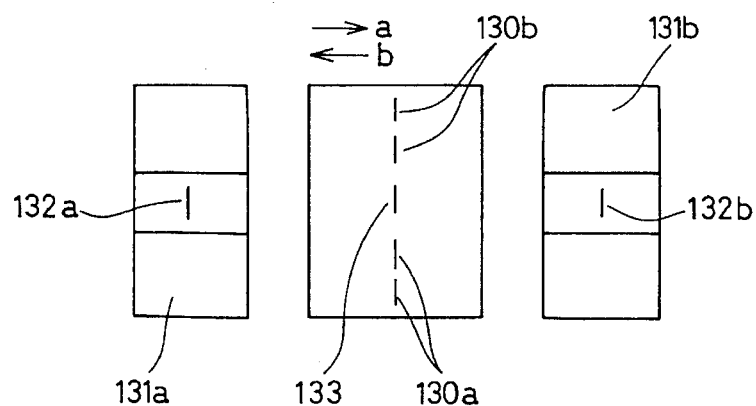
FIG. 9A is a plan view showing arrangement/structure of a fixed auto reverse head formed by integrating a magnetic head for detecting a tape speed with that for recording/reproducing information.
Figure 9B:
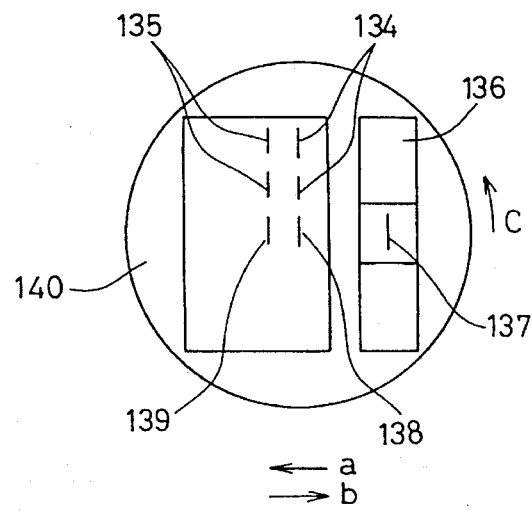
FIG. 9B is a plan view showing arrangement/structure of a rotary auto reverse head formed by integrating a magnetic head for detecting a tape speed with that for recording/reproducing information.

While the magnetic heads for detecting the tape speed and for recording/reproducing information are provided independently of each other according to this embodiment, such magnetic heads may be integrated with each other, as shown in FIGS. 9A and 9B. FIGS. 9A and 9B illustrate magnetic tape sliding surfaces of such integrated magnetic heads as viewed from the magnetic tape sides.

FIG. 9A shows a fixed auto reverse head, which switches gaps for recording/reproducing information and recording/erasing gaps for speed detection to recording or erasing in response to the travelling direction of the magnetic tape. When the magnetic tape travels along arrow a in FIG. 9A, recording/reproducing gaps 130a and an erasing gap 131a are employed for recording/reproducing information while gaps 132a, 133 and 132b are employed as recording, reproducing and erasing gaps respectively for detecting the speed. When the magnetic tape travels along arrow b in FIG. 9A, on the other hand, recording/reproducing gaps 130b and an erasing gap 131b are employed for recording/reproducing information while the gaps 132b, 133 and 132a are employed as recording, reproducing and erasing gaps respectively for detecting the speed.

FIG. 9B shows a rotary auto reverse head, which rotates a head base 140 in response to the travelling direction of the magnetic tape. In the state shown in FIG. 9B, the magnetic tape travels along arrow a. When the magnetic tape travels along arrow b, the head base 140 is rotated by 180° along arrow c. Referring to FIG. 9B, gaps 134, 135 and 136 are recording, reproducing and erasing gaps for recording/reproducing information respectively, while gaps 137, 138 and 139 are recording, reproducing and erasing gaps for detecting the speed respectively.

Figure 10A:
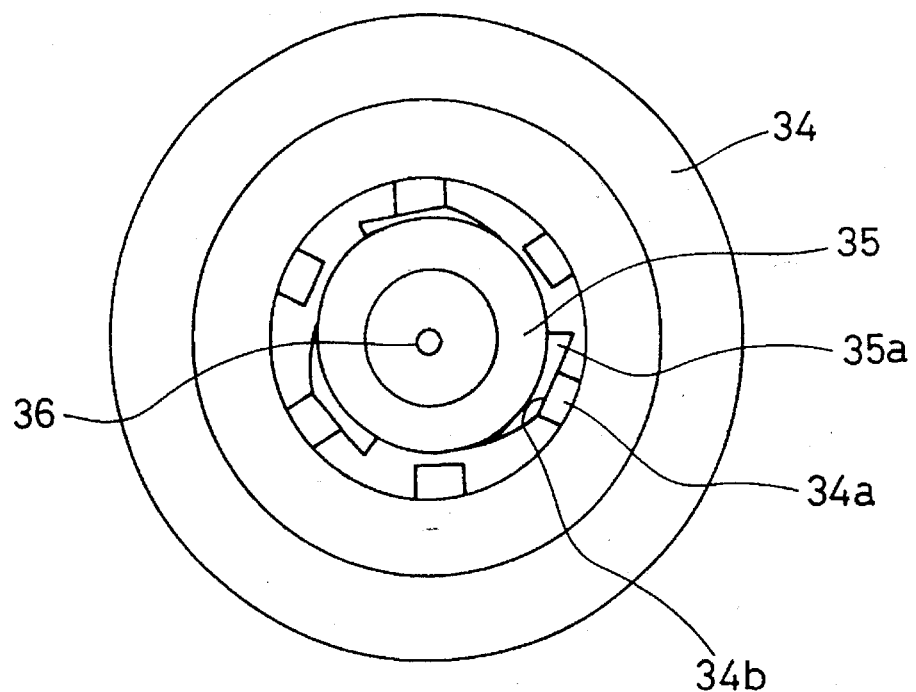
FIGS. 10A and 10B are a plan view and a perspective view showing a coupled state of a reel hub and a hub clutch in the second embodiment of the present invention.
Figure 10B:
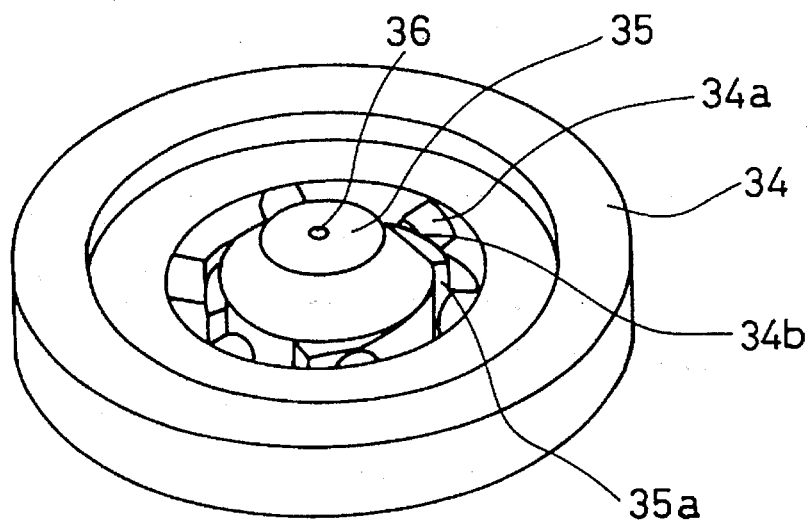

Driving force is transmitted from the reel drive motor 27 or 28 to the reel 21 or 22 through coupling between a hub clutch which is mounted on the forward end of an output shaft of the reel drive motor 27 or 28 and a reel hub provided on the center of the reel 21 or 22. FIGS. 10A and 10B illustrate such a coupling state. A hub clutch 35 which is coupled with a reel hub 34 is fixed to a reel shaft 36, and rotated therewith when the reel shaft 36 is driven by the reel drive motor 27 or 28.

Three pawls 35a of the hub clutch 35 are in the form of wedges as shown in FIG. 10A, so that respective side surfaces of the pawls 35a press side surfaces 34b of three pins 34a provided on the reel hub 34 to fix the reel hub 34 along the take-up direction while matching the centers of rotation of the reel hub 34 and the hub clutch 35 with each other. The reel hub 34 is fixed only in the take-up direction, so that the magnetic recording/reproducing apparatus can be mounted on/detached from a tape cassette (not shown).

Figure 11A:
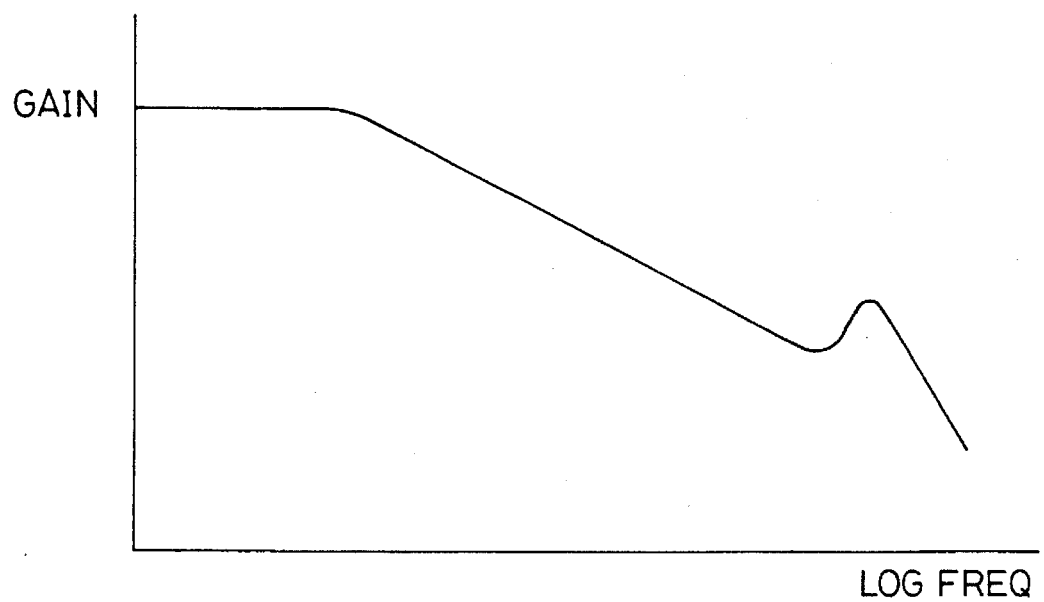
FIG. 11A illustrates a closed loop characteristic of a tape speed control system with a backlash caused between a reel hub and a hub clutch in the second embodiment of the present invention.
Figure 11B:
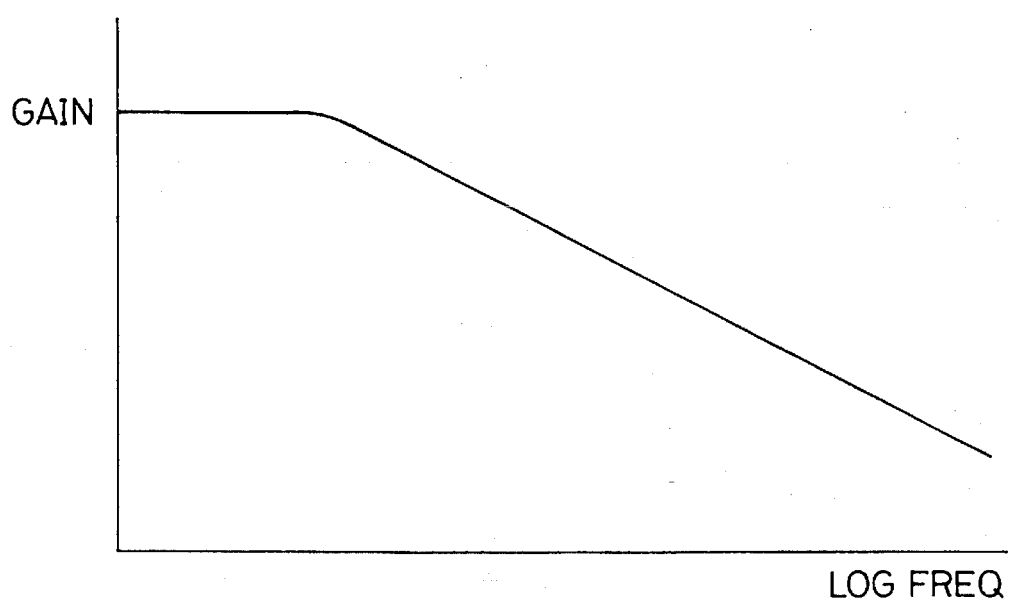
FIG. 11B illustrates a closed loop characteristic of a tape speed control system with no such backlash.

When backlash takes place between the reel hub 34 and the hub clutch 35, the tape speed control system has a closed loop characteristic shown in FIG. 11A. Referring to FIG. 11A, a resonance point appears due to the backlash between the reel hub 34 and the hub clutch 35, to deteriorate the servo characteristic. When the hub clutch 35 is strongly coupled with the reel hub 34 as in the embodiment, on the other hand, the resonance point appearing in FIG. 11A due to the backlash between the hub clutch 35 and the reel hub 34 is shifted toward a higher frequency side to improve the servo characteristic, as shown in FIG. 11B. Namely, the hub clutch 35 and the reel hub 34 provided on the take-up side may be strongly coupled with each other as in the embodiment, in order to suppress influence by resonance appearing due to backlash between the same.

A third embodiment of the present invention is now described. The third embodiment is identical in structure to the second embodiment, except a method of coupling each hub clutch with each reel hub.

Figure 12:
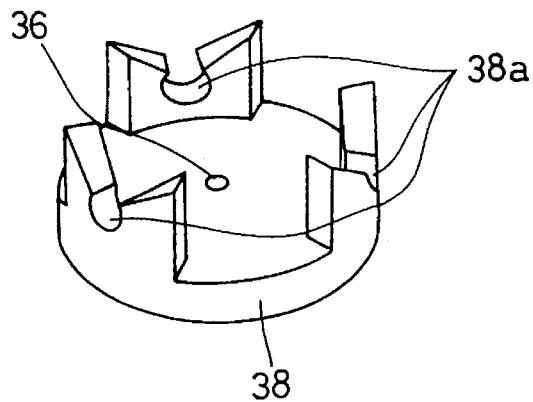
FIG. 12 is a perspective view showing a hub clutch provided in a third embodiment of the present invention.
Figures 13A, 13B, 13C:
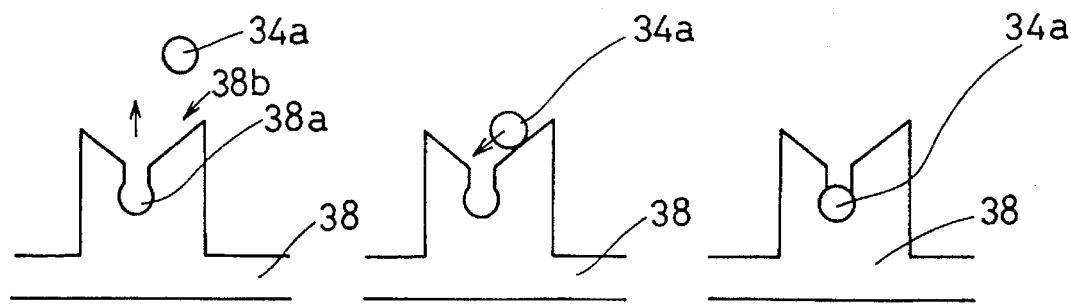
FIGS. 13A, 13B and 13C are adapted to illustrate coupling between the hub clutch and a reel hub.

FIG. 12 shows the shape of a hub clutch 38 according to this embodiment, and FIGS. 13A to 13C illustrate coupling between the hub clutch 38 and a reel hub 34. The hub clutch 38 is provided with holding portions 38a, which are made of an elastic material such as rubber or resin, for pin portions 34a of the reel hub 34. When a tape cassette (not shown) is mounted on this magnetic recording/reproducing apparatus and the hub clutch 38 is inserted in the reel hub 34, the pin portions 34a of the reel hub 34 come into contact with inclined surfaces 38b of the hub clutch 38 (FIG. 13B), to be guided into the holding portions 38a and held therein by elastic force. The hub clutch 38 and the reel hub 34 are coupled with each other strongly in a direction of reel rotation and weakly in a direction of reel rotation axis (FIG. 13C). Thus, the tape cassette (not shown) can be easily detached from this magnetic recording/reproducing apparatus.

A fourth embodiment of the present invention is now described. Similarly to the third embodiment, the fourth embodiment is similar in structure to the second embodiment, except a method of coupling each hub clutch with each reel hub.

Figure 14:
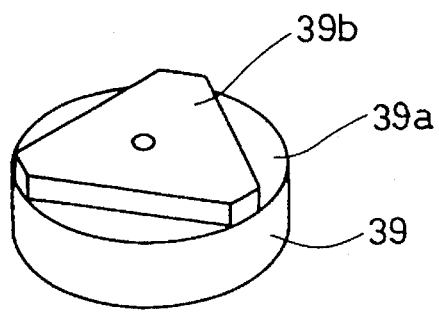
FIG. 14 is a perspective view showing a hub clutch provided in a fourth embodiment of the present invention.
Figure 15A:
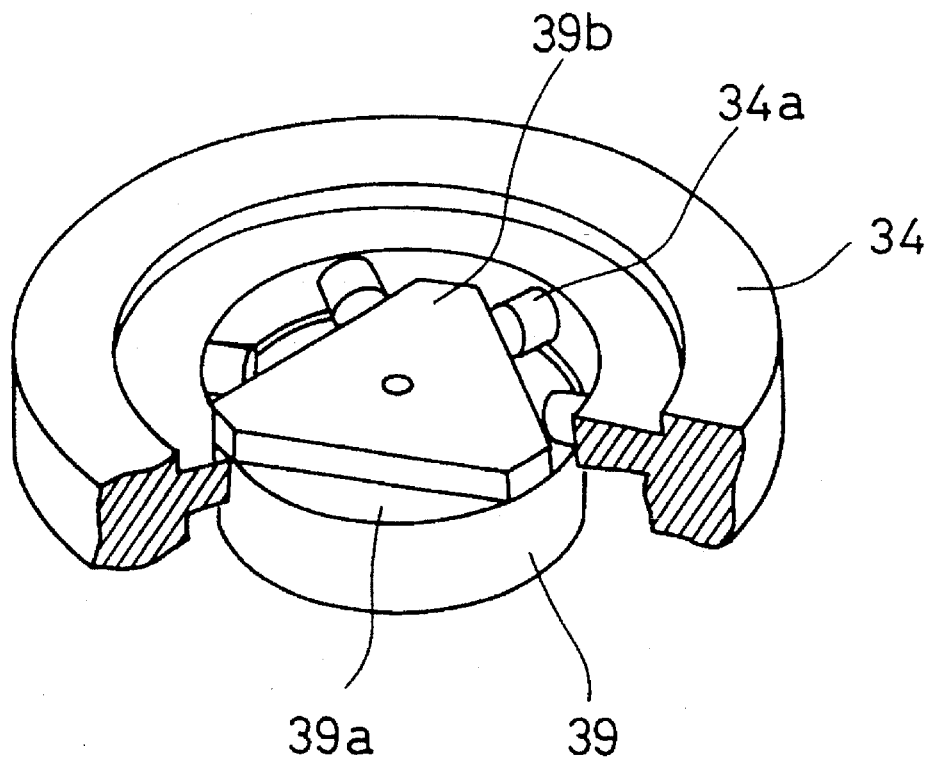
FIGS. 15A and 15B are a partially fragmented perspective view and a side elevational sectional view showing a coupling state of a reel hub and the hub clutch in the fourth embodiment of the present invention.
Figure 15B:
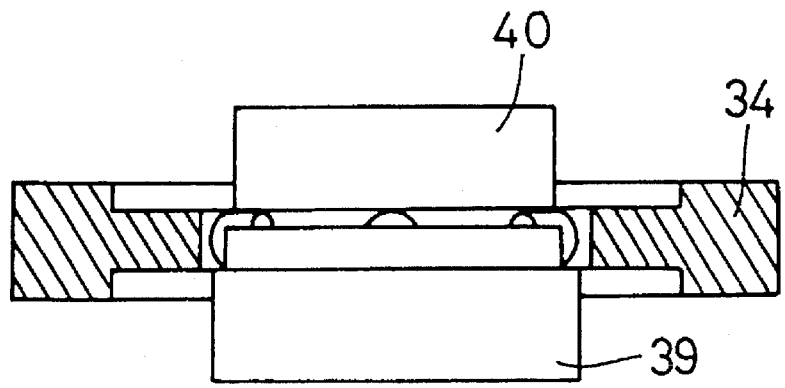

FIG. 14 shows the shape of a hub clutch 39 according to this embodiment. This hub clutch 39 has a triangular pin fixing base 39b on a cylindrical clutch base 39a. FIGS. 15A and 15B are perspective and side elevational views showing the hub clutch 39, which is inserted in a reel hub 34. Pins 34a of the reel hub 34 are supported by the clutch base 39a and the pin fixing base 39b, while a hub fixing plate 40 provided in a cassette holder (not shown) of this magnetic recording/ reproducing apparatus is inserted in a hub clutch receiving hole of a tape cassette (not shown) from an opposite side of the hub clutch 39 to press the pin portions 34a against the clutch base 39a, so that the former are not upwardly separated from the latter. Thus, the reel hub 34 is fixed to the hub clutch 39. The hub fixing plate 40 is mounted on the cassette holder to be rotatable with the reel hub 34 and the hub clutch 39.

When the tape cassette is detached from the magnetic recording/reproducing apparatus, the cassette holder moves with the tape cassette, to release the hub clutch 39 from the hub fixing plate 40.

Figure 16:
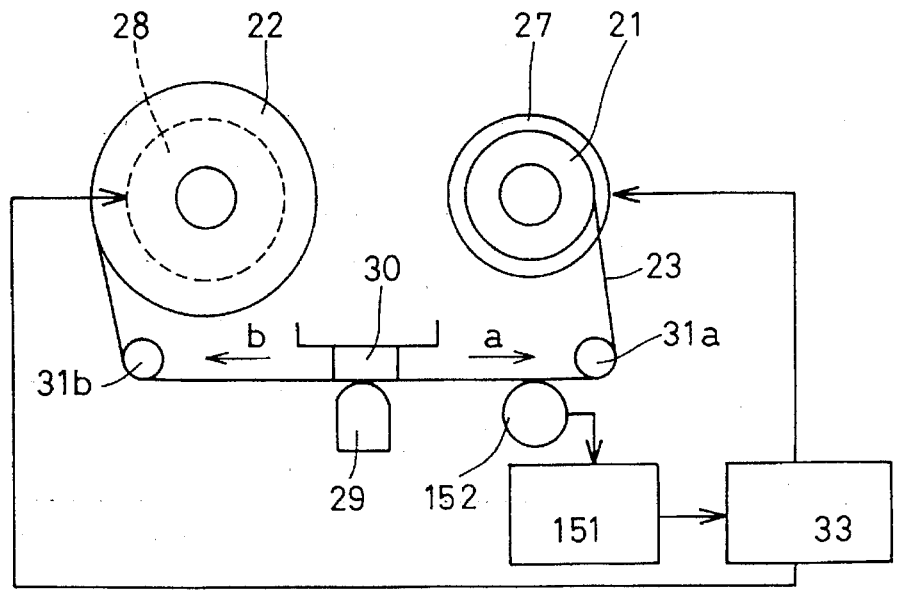
FIG. 16 schematically illustrates the structure of a magnetic recording/reproducing apparatus according to a fifth embodiment of the present invention.

A fifth embodiment of the present invention is now described with reference to FIG. 16. This embodiment is different in speed detecting method from the second to fourth embodiments. Portions similar to those of the second embodiment are denoted by the same reference numerals. Similarly to the second embodiment, a magnetic tape 23 which is wound on reels 21 and 22 travels along arrow a or b in this embodiment, and a pressure pad 30 presses the magnetic tape 23 against an information recording/reproducing magnetic head 29 to record/reproduce information.

An operation for recording/reproducing information is now described. A speed detecting roller 152 which is in contact with the magnetic tape 23 is rotated following travelling of the magnetic tape 23, at a rotational speed which is proportionate to the tape speed. This speed detecting roller 152 comprises the so-called FG (frequency generator), and outputs a signal having a frequency which is proportionate to the rotational speed, so that a speed detecting circuit 151 obtains a speed signal. According to this embodiment, the speed detecting circuit 151 is formed by an F-V converter, so that a voltage outputted in proportion to the frequency serves as tape speed information. This tape speed information is guided to a control circuit 33, which in turn compares the as-detected tape speed with a prescribed tape speed and carries out an operation, to drive a reel drive motor 27 or 28 so that the tape 23 travels at a constant speed. The control circuit 33 drives the reel drive motor 27 when the tape 23 travels along arrow a, while the same travels the reel drive motor 28 when the tape 23 travels along arrow b. Thus, the tape travelling speed is controlled at a prescribed low constant speed in recording/reproduction of information. An operation for fast-forwarding the tape 23 is similar to that in the first embodiment.

A sixth embodiment of the present invention is now described with reference to FIG. 17. This embodiment carries out the following operation for recording/reproducing information: A speed detecting roller 152 which is in contact with a magnetic tape 23 is rotated following travelling thereof at a rotational speed being proportionate to the tape speed, similarly to the fifth embodiment. The speed detecting roller 152 comprises an FG and outputs a signal 152a, having a frequency proportionate to the rotational speed, which is guided to a speed detecting circuit 160. On the other hand, a reel 21 serving as a take-up reel comprises a reel rotation detecting sensor 161, which detects the rotational speed of this reel 21. According to this embodiment, a signal 161a having a frequency which is proportionate to the rotational speed of the reel 21 is outputted and guided to the speed detecting circuit 160. As described later, the speed detecting roller 152 may have relatively low frequency resolution, which may not be provided with a band exceeding a servo band.

The speed detecting circuit 160 F-V converts the frequency signal 161a which is proportionate to the rotational speed of the reel 21, to obtain speed information. Resolution (frequency) of this speed information is higher than that of the signal 152a, i.e., higher than a follow-up frequency of this control system, to provide speed information in a high-frequency band of this system. On the other hand, the signal 152a from the speed detecting roller 152 is also F-V converted by the speed detecting circuit 160, to provide tape speed information. This signal 152a received from the roller 152 has lower resolution than the signal 161 received from the reel 21. Therefore, information in a low-frequency band is in higher accuracy than the signal 161a from the reel 21, although the same does not independently satisfy information in a band required for this control system. This is because the roller 152 which is rotated in direct contact with the tape 23 regularly detects a correct tape speed averagely (at a low frequency).

On the other hand, the signal 161a received from the reel 21 does not correctly express the tape speed at a low frequency averagely since the rotational speed of the reel 1 changes in response to the roll radius of the tape 23 in inverse proportion thereto even if the tape 23 travels at a constant speed. However, this signal 161a expresses tape speed change in a high-frequency band of the so-called wow and flutter region.

A low frequency component of the speed information from the signal 152a is extracted by a low-pass filter while a high frequency component of the speed information from the signal 161a is extracted by a high-pass filter, so that these components are added up to calculate the tape speed.

Thereafter a control circuit 33 detects and operates a speed error and drives a reel drive motor 27 to drive/control the reel 21, similarly to the fifth embodiment.

Figure 17:
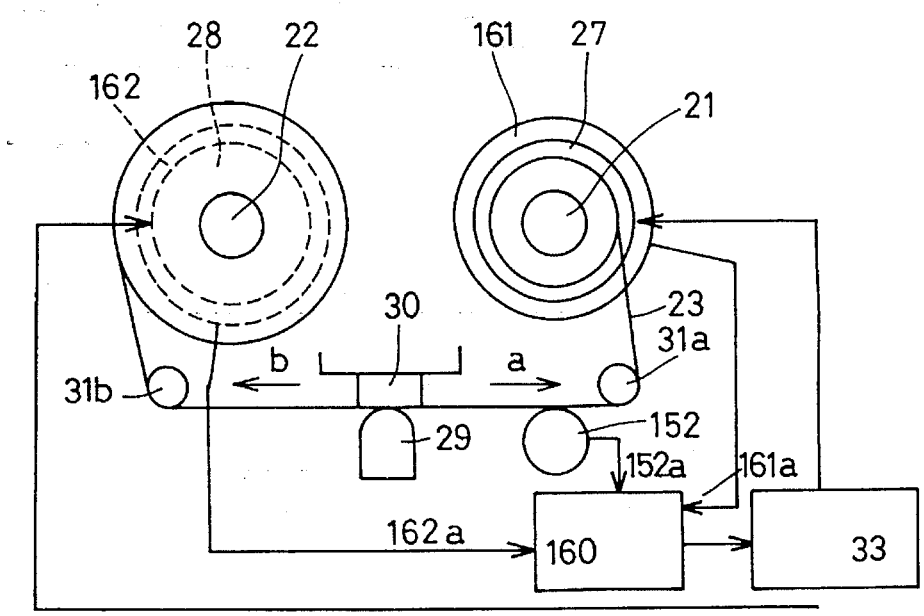
FIG. 17 schematically illustrates the structure of a magnetic recording/reproducing apparatus according to a sixth embodiment of the present invention.

The aforementioned operation is carried out when the magnetic tape 23 travels along arrow a in FIG. 17. When the magnetic tape 23 travels along arrow b, on the other hand, a reel 22 serves as a take-up reel, whereby a reel rotation detecting sensor 162 is employed to provide a signal 162a for reel rotational speed information and a reel drive motor 28 is driven to carry out an operation similar to the above.

In the magnetic recording/reproducing apparatus of this embodiment having the aforementioned structure, the speed detecting roller 152 may be inferior in accuracy to the aforementioned speed detecting roller 150, to simply output a pulse per rotation, for example. Therefore, this speed detecting roller 152 may be prepared at a relatively low cost. A fast forward operation of this embodiment is similar to that of the second embodiment.

Figure 18:
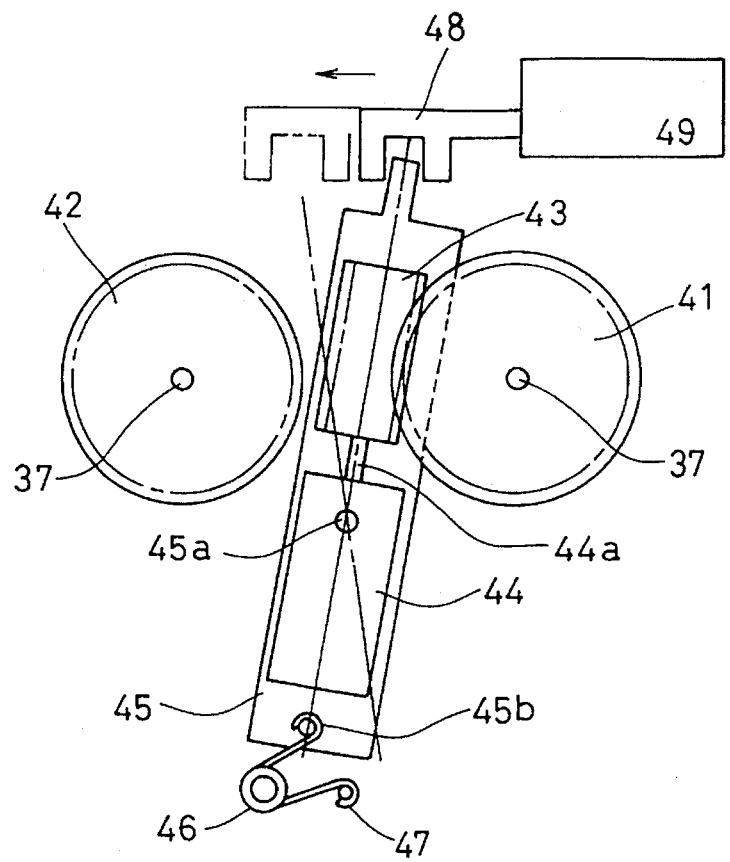
FIG. 18 illustrates a speed reduction mechanism employing a worm gear in a magnetic recording/reproducing apparatus according to a seventh embodiment of the present invention.
Figure 19:
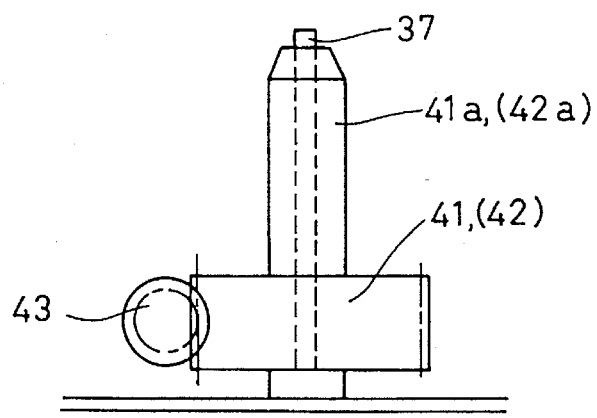
FIG. 19 is a side elevational view showing the worm gear provided in the seventh embodiment of the present invention.

A seventh embodiment of the present invention is now described with reference to FIGS. 18 and 19. FIG. 18 shows a reel driving system employing a worm gear, and FIG. 19 is a side elevational view showing a worm gear 43 and a worm wheel 41. The worm wheel 41 is provided with a hub clutch portion 41a, while another worm wheel 42 is also provided with a hub clutch portion 42a.

The worm gear 43 is press-fitted in an output shaft 44a of a reel drive motor 44. The reel drive motor 44 and the worm gear 43 are supported on a motor chassis 45, which is supported to be rotatable about a shaft 45a upwardly provided on a mechanical chassis. A spring 46 is provided between spring fixing pins 45b and 47 which are provided on the motor chassis 45 and the mechanical chassis respectively, to pressurize the motor chassis 45 so that the worm gear 43 engages with the worm wheel 41. The other worm wheel 42, which is not coupled with this driving system, is freely rotatable about a reel shaft 37. The reel drive motor 44 is driven to drive the worm wheel 41, thereby forwarding a magnetic tape from a reel provided on the worm wheel 42 side to that provided on the worm wheel 41 side at a constant speed. A fast forward state is obtained when the rotational speed of the reel drive motor 44 is increased.

When a buffer arm 48 is driven along arrow in FIG. 18 by a switching mechanism 49, the motor chassis 45 is rotated about the rotary shaft 45a, and the spring 46 pressurizes the motor chassis 45 so that the worm gear 43 engages with the worm wheel 42. At this time, the worm wheel 41 is not coupled with the driving system and freely rotatable about a reel shaft 37. When the rotational direction of the reel drive motor 44 is reversed to drive the worm wheel 42, the magnetic tape is forwarded from the reel provided on the worm wheel 41 side to that provided on the worm wheel 42 side at a constant speed. A fast forward operation can be carried out by increasing the rotational speed of the reel drive motor 44.

According to this embodiment, it is possible to bidirectionally drive the magnetic tape at a constant speed and a high speed, as hereinabove described.

When a worm gear is employed, it is possible to obtain a high speed reduction ratio in single-stage speed reduction and the rotational speed of a motor can be increased as compared with a direct drive state so that the motor can be used in the vicinity of an efficient rotational speed, whereby power consumption can be reduced. Due to such increase in rotational speed of the motor, influence exerted by a ripple can be shifted to a high frequency region. Further, the worm gear can be brought into a state regularly engaging with a worm gear, whereby it is possible to reduce wow and flutter as compared with a case of employing a spur gear.

Driving mechanisms similar to that of this embodiment can be applied to the third and fourth embodiments, as a matter of course.

An eighth embodiment of the present invention is now described with reference to FIGS. 20 and 21. This embodiment is similar in structure to the seventh embodiment, except a reel driving system.

Figure 20:
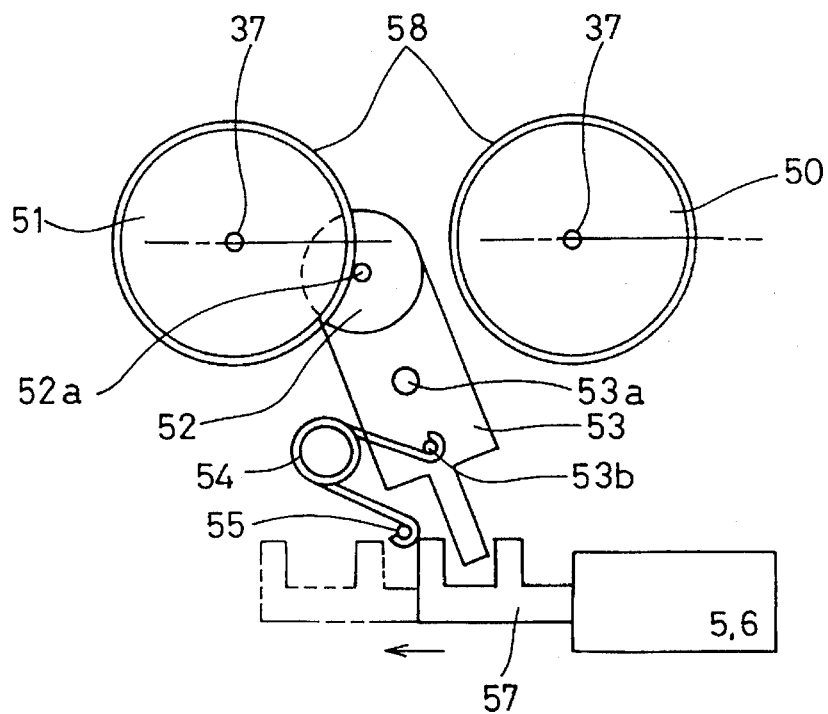
FIG. 20 illustrates a speed reduction mechanism employing driving wheels in a magnetic recording/reproducing apparatus according to an eighth embodiment of the present invention.
Figure 21:
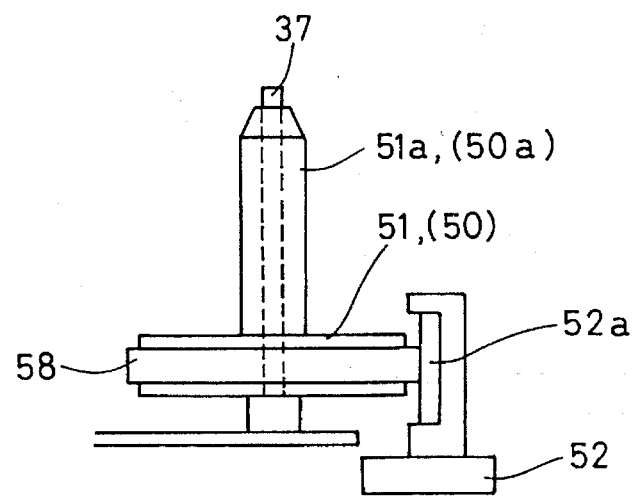
FIG. 21 is a side elevational view showing each driving wheel provided in the eighth embodiment of the present invention.

According to this embodiment, driving wheels 50 and 51 shown in FIG. 20 are formed by discoidal plates having side surfaces to which rubber members 58 are bonded/fixed. As shown in FIG. 21, these driving wheels 50 and 51 are integrated with hub clutch portions 50a and 51a. An output shaft 52a of a reel drive motor 52 is pressed against the rubber member 58 provided on the side surface of the driving wheel 51 by pressing force of a spring 54. Thus, driving force of the reel drive motor 52 is transmitted from the rubber member 58 to the driving wheel 51. When the driving wheel 51 is driven by the reel drive motor 52, a magnetic tape is forwarded from a reel provided on the driving wheel 50 side to that provided on the driving wheel 51 side at a constant speed. A fast forward operation can be carried out by increasing the rotational speed of the reel drive motor 52.

When a buffer arm 57 is driven along arrow in FIG. 20 by a switching mechanism 56, a motor chassis 53 is rotated about a rotary shaft 53a, so that the spring 54 presses the output shaft 52a of the reel drive motor 52 against the driving wheel 50. The other driving wheel 51 is not coupled to the driving system and freely rotatable about a reel shaft 37. When the reel drive motor 52 reversed in rotational direction drives the driving wheel 50, the magnetic tape is forwarded from the reel provided on the driving wheel 51 side to that provided on the driving wheel 50 side at a constant speed. A fast forward operation can be carried out by increasing the rotational speed of the reel drive motor 52.

According to the driving method of this embodiment, it is possible to obtain a high speed reduction ratio in single-stage speed reduction and the rotational speed of the reel drive motor 52 can be increased as compared with a direct drive state so that the motor can be used in the vicinity of an efficient rotational speed, whereby power consumption can be reduced. Due to such increase in rotational speed of the motor, influence exerted by a ripple is shifted to a high frequency region. Further, the motor output shaft 52a is pressed against the rubber member 58 provided on the side surface of each driving wheel to transmit power, whereby no wow and flutter components are caused dissimilarly to those caused by engagement of teeth of gears.

The rubber members 58, which are provided on the outer peripheral portions of the driving wheels 50 and 51 according to this embodiment, may be replaced by materials having high rigidity. Further, driving mechanisms similar to that of this embodiment can be applied to the third and fourth embodiments, as a matter of course.

A ninth embodiment of the present invention is now described with reference to FIGS. 22 and 23. The ninth embodiment is related to a servo method for detecting the travelling speed of a magnetic tape with two magnetic heads.

Figure 22:
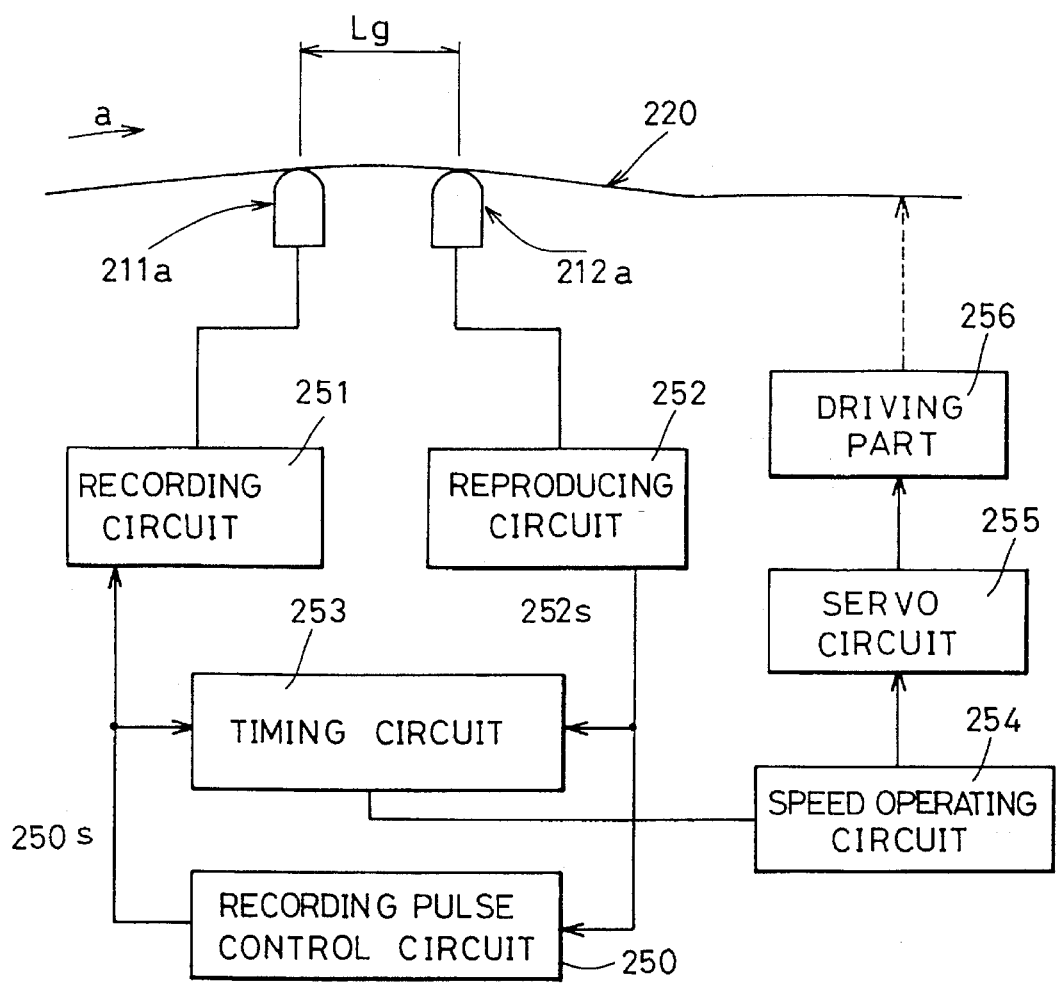
FIG. 22 is a block diagram showing a magnetic recording/reproducing apparatus according to a ninth embodiment of the present invention.
Figure 23:
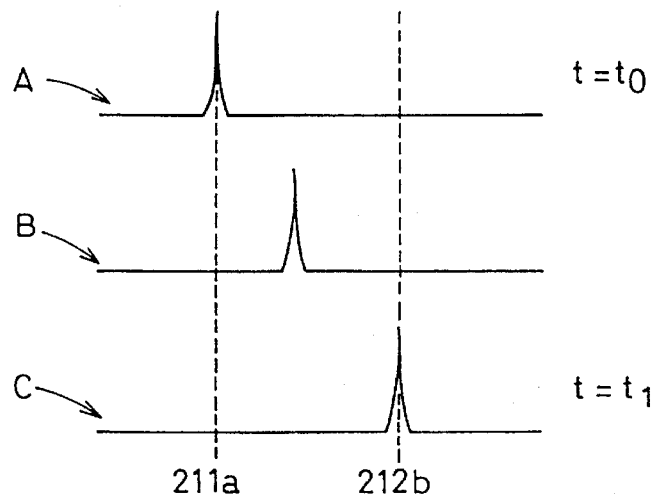
FIG. 23 is adapted to illustrate the operation of a speed detecting signal in the embodiment shown in FIG. 22.

Referring to FIG. 22, a recording head 211a and a reproducing head 212a are arranged in the magnetic recording/reproducing apparatus according to this embodiment at a distance $L_g$. When a magnetic tape 220 travels along arrow a in FIG. 22, a recording pulse control circuit 250 generates a recording signal 250s to a recording circuit 251, which in turn supplies a recording pulse current to the recording head 211a so that a pulse signal is recorded on the magnetic tape 220. FIG. 23 typically illustrates a magnetization pattern of this case by arrow A. Following travelling of the magnetic tape 220, the magnetization signal pattern moves as shown by arrows B and C in FIG. 23, so that the reproducing head 212a and a reproducing circuit 252 detect the signal and a reproducing pulse signal 252s is transmitted to a timing circuit 253 at a point of time shown by arrow C in FIG. 23.

The recording signal 250s supplied from the recording pulse control circuit 250 is also guided to the timing circuit 253. The timing circuit 253 measures a period between times $t_0$ and $t_1$ of supply of the recording signal 250s and detection of the reproducing pulse signal 252s. The timing circuit 253 outputs the as-measured pulse transit time $T_g$ to a speed operating circuit 254, which in turn operates a tape speed v along the following equation (1):

$$v = L_g/T_g \quad (1)$$

The tape speed v is supplied to a servo circuit 255, which in turn supplies a servo signal to a driving part 256, whereby a driving mechanism (not shown) drives the tape 220 to control the tape speed.

The reproducing pulse signal 252s generated from the reproducing circuit 252 is also guided to the recording pulse control circuit 250 as a trigger signal, so that the recording pulse control circuit 250 generates a new recording pulse signal 250s to repeat the aforementioned operation. This cycle period defines a sampling period $T_S$ of speed detection.

The period for measuring the pulse transit time $T_g$ and operating the tape speed v, i.e., the sampling period $T_S$, is the sum of a signal processing delay time $T_L$ such as a detection delay and the pulse transit time $T_g$, and hence the following equation (2) holds:

$$T_S = T_L + T_g \quad (2)$$

The signal processing delay time $T_L$ is the sum of a delay time between transmission of the reproducing pulse signal 252s to the recording pulse control circuit 250 and generation of the recording pulse signal 250s and a detection delay caused in the reproducing circuit 252 by a reproducing signal processing method for a written magnetization signal pattern.

Assuming that $f_c$ represents a servo band frequency of the object servo system, a reference value $T_{SO}$ of the sampling period $T_S$, which is determined on the basis of this frequency $f_c$, is generally set at a value not more than one severalth of $1/f_c$, for example. On the basis of the reference value $T_{SO}$, the signal processing delay time $T_L$ and a desired tape speed $v_0$, the distance $L_g$ is determined by the following equation (3):

$$L_g = v_0 \cdot (T_{SO} - T_L) \qquad (3)$$

Therefore, the distance $L_g$ between the recording and reproducing heads 211a and 212a may be set to satisfy the equation (3). It is also possible to intentionally set the signal processing delay time $T_L$ to attain desired values $T_{SO}$ and $L_g$ within a range allowing holding of the equation (3).

The above description is related to an operation carried out when the tape 220 travels along arrow a in FIG. 22. When the tape 220 travels in a reverse direction, on the other hand, the recording and reproducing heads 211a and 212a may be replaced in connection or arrangement with each other.

Figure 24:
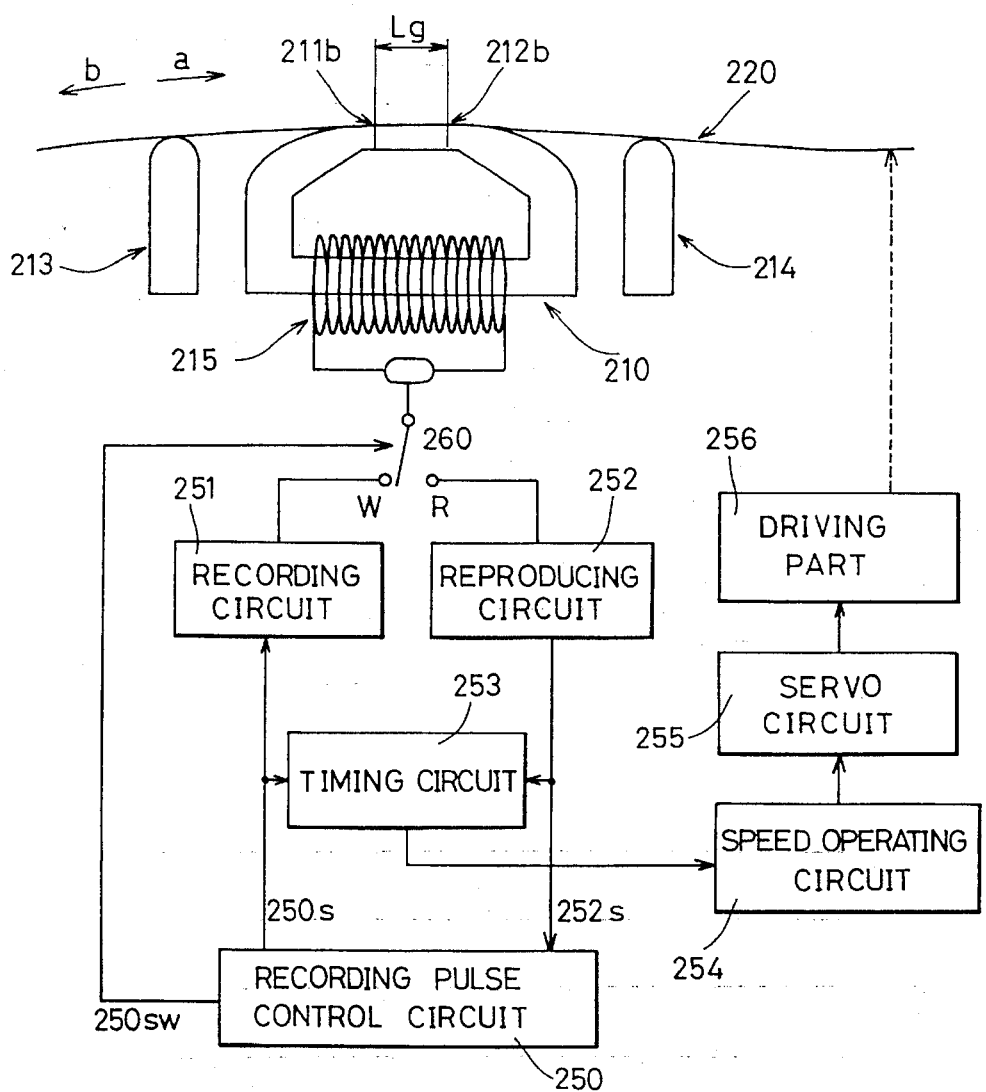
FIG. 24 is a block diagram showing a magnetic recording/reproducing apparatus according to a tenth embodiment of the present invention.

A tenth embodiment of the present invention is now described with reference to FIGS. 24 and 25. The tenth embodiment is related to a servo method for detecting the travelling speed of a magnetic tape with two magnetic gaps which are provided in a single magnetic head, and circuits having similar functions to those of the ninth embodiment are denoted by the same reference numerals. Referring to FIG. 24, two equivalent magnetic gaps 211b and 212b are arranged in the magnetic recording/reproducing apparatus of this embodiment at a distance $L_g$. Erasing heads 213 and 214 are provided in front and at the back of the magnetic gaps 211b and 212b respectively, to serve as the so-called DC erasing magnets or AC erasing heads. The magnetic gaps 211b and 212b and the erasing heads 213 and 214 are arranged to act on the same track (speed detecting track) on a magnetic tape 220.

First, consider that the magnetic tape 220 travels along arrow a in FIG. 24. The erasing head 213 first erases a magnetic signal recorded on the speed detecting track of the magnetic tape 220. This operation is not necessarily required if the magnetic recording signal has been already erased from the track.

A recording pulse control circuit 250 generates a write control signal 250s, which is supplied to a recording circuit 251. The recording pulse control circuit 250 also supplies a switching signal 250sw to a switch 260, to connect the switch 260 to a side W. The recording circuit 251 feeds a pulse current to a coil 215 through the switch 260, to induce magnetic flux in a head core 210. Thus, the magnetic gaps 211b and 212b simultaneously operate to record information on the magnetic tape 220, which is a magnetic recording medium. At this time, magnetization is carried out by a signal pattern having two pulses, as shown by A in FIG. 25. Immediately after recording of the signal, the switch 260 is switched to a side R by the signal 250sw received from the recording pulse control circuit 250, so that the coil 251 is cut off from the write current and connected to a reproducing circuit 252. When the magnetic tape 220 moves upon travelling as shown by B in FIG. 25 and the magnetization pattern reaches the state shown by C in FIG. 25, the magnetic gap 212b detects a signal in this magnetization pattern. The reproducing circuit 252 carries out signal processing and generates a reproducing pulse signal 252s, while a timing circuit 253 measures a period between times $t_0$ and $t_1$ of generation of the write signal 250s from the recording pulse control circuit 250 and detection of the reproducing signal 252s. A speed operating circuit 254 calculates a tape speed v along the equation (1) described above with reference to the ninth embodiment, to drive/control the tape 220 through a servo circuit 255 and a driving part 256. According to this embodiment, the tape travelling speed v is compared with a reference speed $v_0$ to obtain a speed error signal, which is fed back to a tape drive motor so that the tape 220 is controlled to travel at a constant speed.

Figure 25:
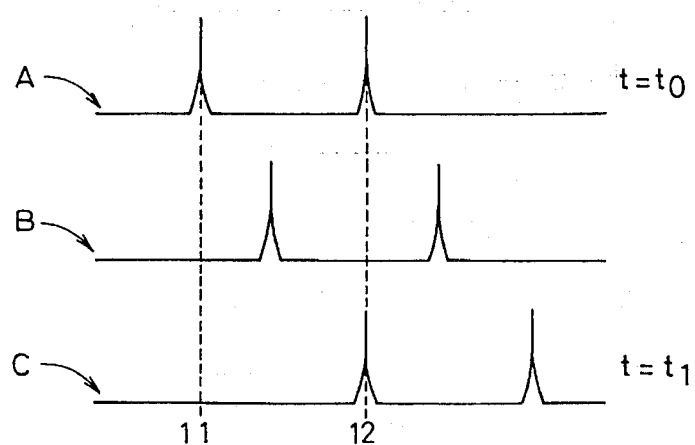
FIG. 25 is adapted to illustrate the operation of a speed detecting signal in the embodiment shown in FIG. 24.

Simultaneously with signal detection and measurement of the time $T_g$ at the time C shown in FIG. 25, the recording pulse control circuit 250 re-generates the write signal 250s with the reproducing signal 252s serving as a trigger signal. A recording current is fed to the coil 215, to return to the state shown by A in FIG. 25. Thereafter the same operation is repeated to detect the tape travelling speed v every cycle period (sampling period) $T_S$.

Following travelling of the magnetic tape 220, the recording magnetization pattern detected at the time C shown in FIG. 25 is erased by the erasing head 214.

The sampling period $T_S$, a signal processing delay time $T_L$, the reference speed $v_0$ and the distance $L_g$ are decided along the equations (2) and (3), similarly to the ninth embodiment. For example, the distance $L_g$ is 30 μm when the reference speed $v_0$ is 50 mm/s, the sampling period $T_S$ is 650 μs and the signal processing delay time $T_L$ is 50 μs.

The aforementioned operation is carried out when the magnetic tape 220 travels along arrow a in FIG. 24. When the magnetic tape 220 reversely travels along arrow b, on the other hand, the magnetic gaps 211b and 212b and the erasing heads 213 and 214 simply exchange functions with each other. Therefore, it is possible to detect the speed of the magnetic tape 220 travelling in the reverse direction (along arrow b) with no changes of the circuits and the arrangement. In other words, it is possible to reversely drive the magnetic tape 220 by simply switching the driving/control system, with no requirement for switching of a speed detecting part or the like.

While the ninth and tenth embodiments are mainly applied to magnetic recording/reproducing apparatuses for driving magnetic tapes at constant speeds using no capstans, these embodiments can also be applied to capstan travelling systems.

Figure 26:
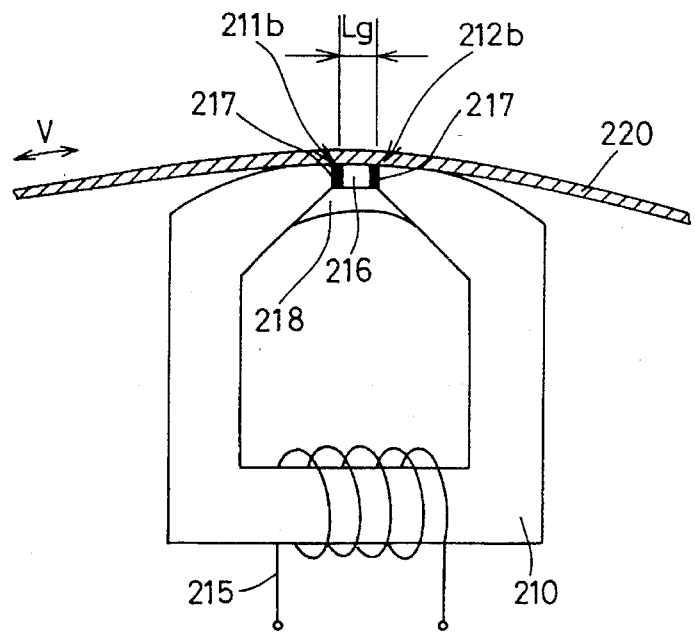
FIG. 26 illustrates an exemplary magnetic head employed in the tenth embodiment of the present invention shown in FIG. 24 in an enlarged manner.

FIG. 26 shows the structure of a magnetic head which is provided with the two magnetic gaps 211b and 212b employed in the tenth embodiment. Referring to FIG. 26, the magnetic gaps 211b and 212b of this magnetic head are provided in a sliding contact surface of the magnetic core 210 with respect to the magnetic tape 220 at the distance $L_g$. Such magnetic gaps 211b and 212b are formed by providing a center core 216 on the magnetic core 210 through a gap member 217. The coil 215, which is employed for recording and reproducing a speed detecting signal, is wound on a base portion of the magnetic core 210 to be interlinked to a magnetic circuit. Back surfaces of the magnetic core 210, the center core 216 and the gap member 217 are bonded by an adhesive 216.

Materials for the magnetic core 210 and the gap member 217 of the magnetic head shown in FIG. 26 and the adhesive 218 for the magnetic core 210 are mainly prepared from MnZn ferrite, $SiO_2$ and an epoxy adhesive or glass having a low melting point respectively. However, the magnetic core 210 may alternatively be prepared from another material which is generally applied to a core of a magnetic head, such as NiZn ferrite, an NiFe alloy (Permalloy (trade name)), an FeAlSi alloy (Sendust (trade name)) or the like, for example.

Further, the gap member 217 may alternatively be formed by a foil member of plastic, a metal, an oxide or a nitride, or a thin film formed by vapor deposition or sputtering, so far as the material is close in wear resistance to the magnetic core 210.

The adhesive 218 may alternatively be prepared from any material so far as the same is practical under environment of application of the magnetic head and can form a sufficiently thin adhesive layer so that magnetic gaps can be defined by the thickness of the gap member 217. Further, the center core 216 separating the two magnetic gaps 211b and 212b from each other may be cut out from a bulky magnetic core material, or provided by a thin film formed by vacuum deposition or sputtering.

Figure 27:
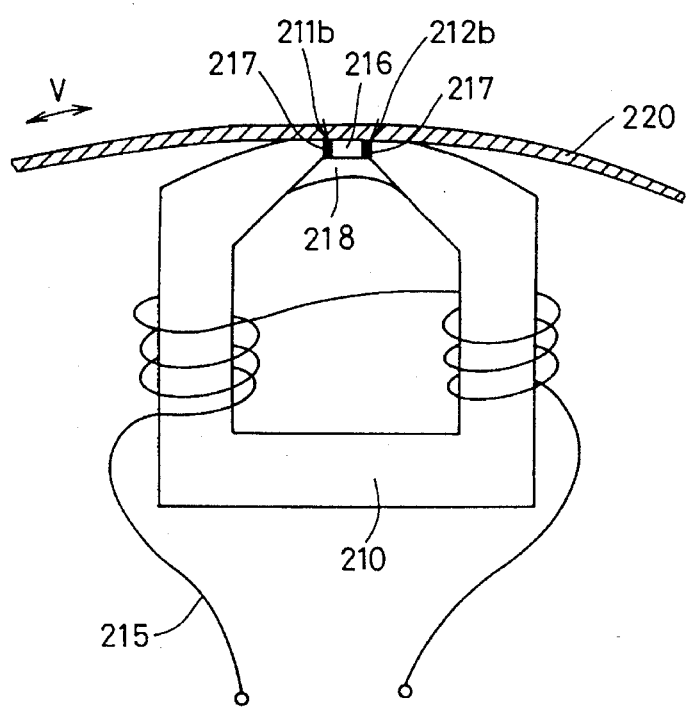
FIG. 27 illustrates another exemplary magnetic head employed in the tenth embodiment of the present invention in an enlarged manner.

The coil 215 may alternatively be wound as shown in FIG. 27. In this case, the coil 215 is wound on both leg portions of the magnetic core 210 in the so-called balance winding manner to be interlinked with a magnetic circuit defined by the magnetic core 210 and the two magnetic gaps 211b and 212b.

Figure 28:
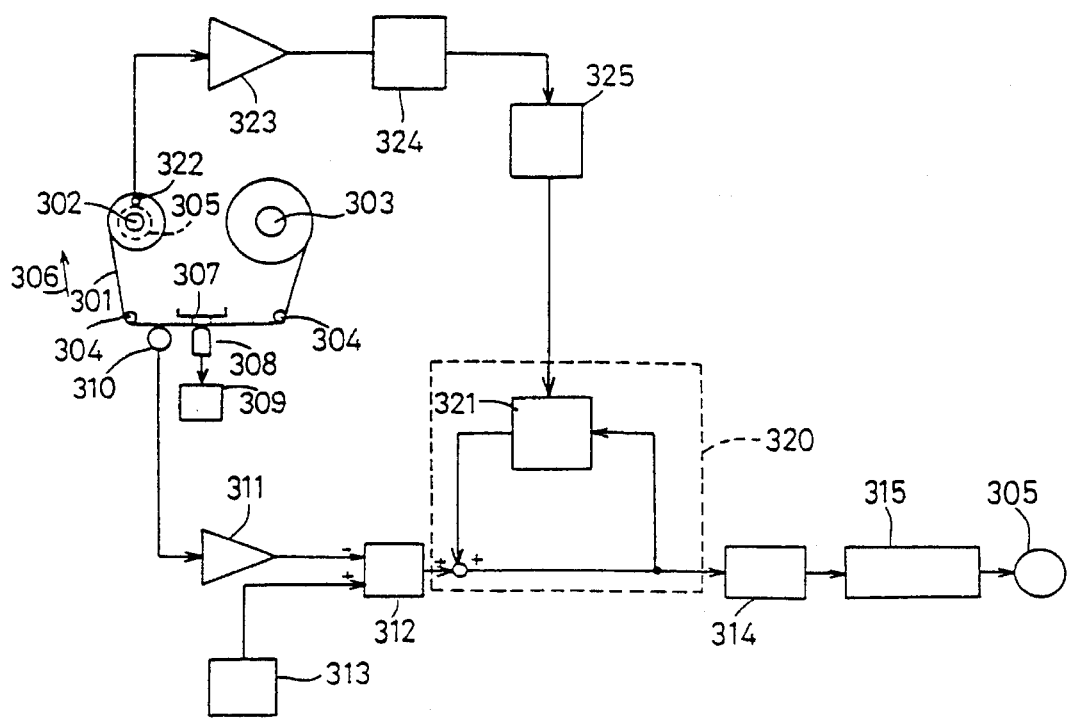
FIG. 28 is a block diagram showing a magnetic recording/reproducing apparatus according to an eleventh embodiment of the present invention.

An eleventh embodiment of the present invention is now described with reference to FIGS. 28 and 29. The eleventh embodiment is related to a constant-speed travelling control system for a magnetic tape in a repeated learning system.

In the magnetic recording/reproducing apparatus according to this embodiment, a learning compensator for learning a periodic speed error caused by a motor torque ripple or the like and adding the same to a next period (delay time) in a feed forward manner is provided in a speed control loop for a reel motor so that the delay time is variable in response to the rotational frequency of a take-up reel. Referring to FIG. 28, a magnetic tape 301 delivered from a supply reel 303 is stabilized by tape guides 304 and wound on a take-up reel 302. The magnetic tape 301, the take-up reel 302 and the supply reel 303 are stored in the same cassette case (not shown). During a recording/reproducing operation of the magnetic recording/reproducing apparatus, the magnetic tape 301 delivered from the supply reel 303 travels along arrow 306 at a constant speed by driving force of a reel motor 305. Another reel motor, which is provided for the supply reel 303, is omitted in FIG. 28 since the same is not directly related to the description of this embodiment.

On the other hand, a magnetic head 308, which is inserted in the cassette case, holds the travelling magnetic tape 301 with a pressure pad 307, thereby recording or reproducing a signal on or from the magnetic tape 301. The signal read from or recorded on the magnetic tape 301 is subjected to prescribed processing by a signal processing part 309. The signal processing part 309 is mainly adapted to process sounds, while its function is not restricted to this.

A speed control loop of this embodiment is now described. Speed control means according to this embodiment comprises a speed detecting part 310 for detecting the travelling speed of the magnetic tape 301, a comparison circuit 312, a target value memory part 313, a phase compensation circuit 314 and a motor driver 315. The speed detecting part 310, which is formed by a roller and a rotary encoder, outputs the speed of the magnetic tape 301 as a pulse signal. The pulse signal obtained by the speed detecting part 310 is shaped into a prescribed waveform by a waveform shaping circuit 311 which is formed by an amplifier and the like, and outputted. The comparison circuit 312 compares the number of pulses received in a constant time with a target value stored in the target value memory part 313, and outputs an error signal. The motor driver 315 drives a reel motor of a next stage in response to a signal as received.

Due to the speed control loop having the aforementioned structure, the reel motor 305 is so controlled that the number of pulses received from the speed detecting part 310 regularly reaches the target value. Consequently, the magnetic tape 301 is driven to travel at a constant speed.

Learning control is now described. A learning compensator 320, which is enclosed with broken lines in FIG. 28, is formed by a delay circuit 321 having a delay time L as described later in detail, and stores an output value of the comparison circuit 312 to add the same to that of the comparison circuit 312 after the time L. A transfer function of this is expressed as follows:

$$G(s) = 1/(1 - e^{-sL})$$

An effect of the aforementioned learning control is described in various papers such as "High Accuracy Control in Repetitive Driving of Proton Synchrotron Electromagnet Power Source", Denki Gakkai Ronbun-Shi C, July 1980, for example.

Figure 29:
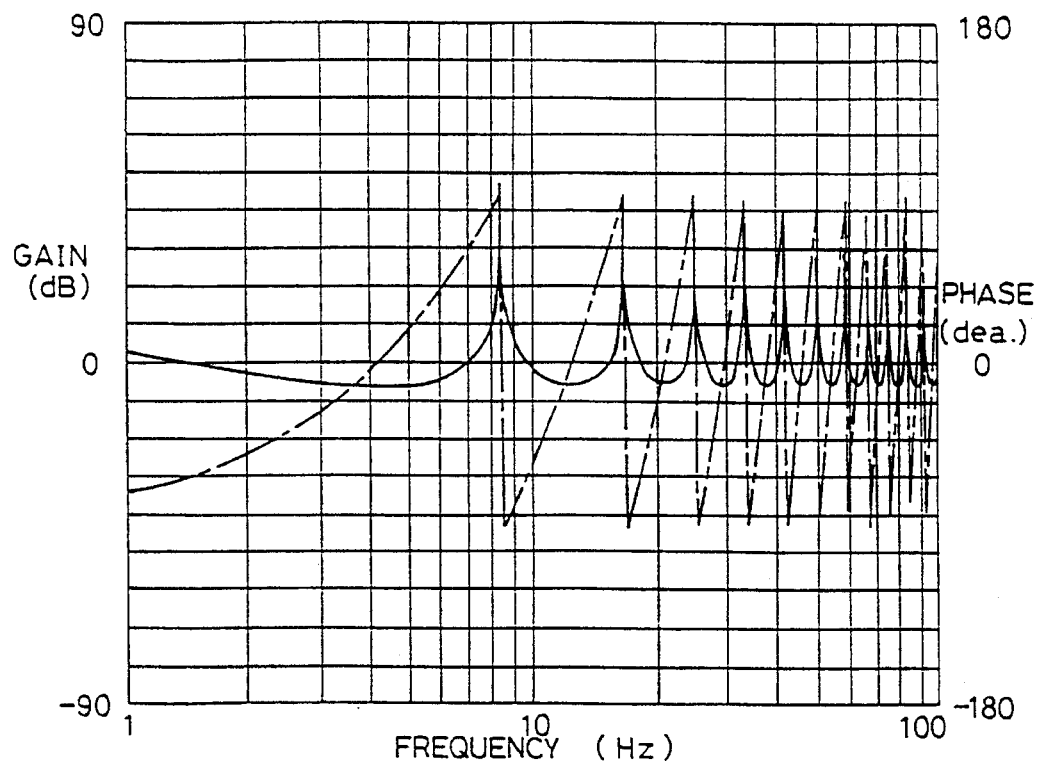
FIG. 29 illustrates transfer characteristics of a learning compensator provided in the embodiment shown in FIG. 28.

FIG. 29 illustrates results of simulation as to transfer characteristics of the learning compensator 320. Referring to FIG. 29, a solid line shows the gain, and the one-dot chain line shows the phase. While the delay time L is set at 8.4 Hz in FIG. 29, it is possible to improve the gain characteristic of the open-loop transfer characteristic with a frequency integral times that of a torque ripple of the reel motor 305 by setting the delay time L at a value corresponding to the period of the torque ripple of the reel motor 305.

On the other hand, a rotational frequency detecting part 322 for the reel motor 305 is adapted to read a pulse pattern (not shown) provided on a rotor of the reel motor 305 by a photointerrupter (not shown), thereby obtaining a pulse which is proportionate to the rotational frequency of the motor 305. Detection of the rotational frequency of the reel motor 305 is not restricted to the above method but can alternatively be implemented through a back electromotive voltage of the reel motor 305, for example. A circuit 323 for shaping the output of the rotational frequency detecting part 322 to a prescribed waveform is formed by an amplifier and the like. A rotational frequency operating circuit 324 calculates the rotational frequency of the reel motor 305 on the basis of a signal received from the circuit 323. A delay time operating circuit 325 calculates a period corresponding to a ripple of the reel motor 305 from the information obtained in the rotational frequency operating circuit 324, to obtain the delay time L in the delay circuit 321.

While this embodiment is adapted to learn information which precedes by one period, a learning compensator for multiple periods may also be employed as described in "Consideration of Disturbance Suppression in Control System using Repetitive Learning Compensator and Proposal of Multiple Period Learning Compensator", System and Control, Vol. 31, No. 5, 1987, for example. A transfer function of such a multiple period learning compensator is as follows:

$$G(s) = 1/\left(1 - \sum_{i=1}^{n} k_i e^{-isL}\right)$$

where $k_i$ represents a coefficient, and n represents multiplicity (2, 3, 4, ...).

In this case, gain reduction is suppressed in transfer characteristics of the compensator out of the delay time and controllability is improved, as described in the aforementioned literature.

Due to the aforementioned structure, the delay time L of the delay circuit 321 is calculated in response to change in rotational frequency of the reel motor 305, whereby it is possible to control the reel motor 305 for regularly reducing a ripple from the beginning of the tape (BOT) to the end of the tape (EOT), so that wow and flutter can be reduced.

A twelfth embodiment of the present invention is now described with reference to FIGS. 30 and 31.

Figure 30:
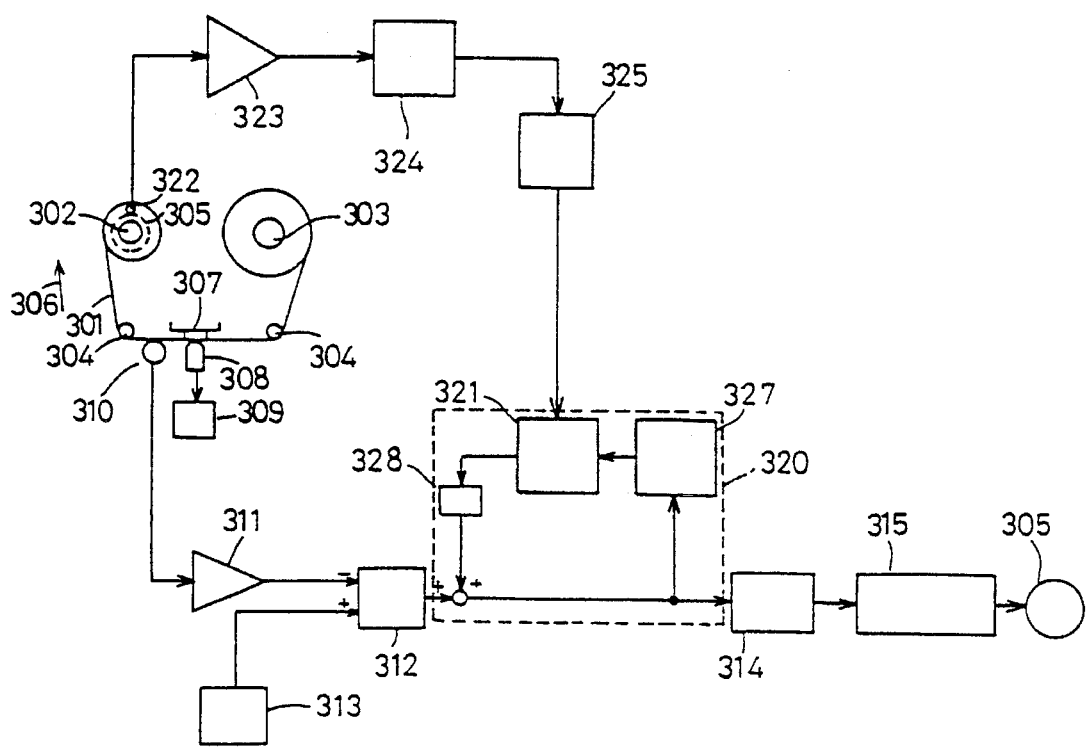
FIG. 30 is a block diagram showing a magnetic recording/reproducing apparatus according to a twelfth embodiment of the present invention.

FIG. 30 is a block diagram showing a magnetic recording/reproducing apparatus, which comprises a learning compensator 320, provided in a speed control loop for a reel motor, for learning a periodic speed error caused by a motor torque ripple or the like and adding the same to a next period (delay time) in a feed forward manner and a band limiting filter 327 and an attenuator 328 provided in a loop of the learning compensator 320. In FIG. 30, components and circuits identical or corresponding to those of the eleventh embodiment are denoted by the same reference numerals, to omit redundant description.

Referring to FIG. 30, the learning compensator 320 is formed by a delay circuit 321, the filter 327 and the attenuator 328. The filter 327, which is adapted to limit the band of the learning compensator 320, limits the gain in a region other than a band including a periodic speed error (motor torque ripple) to ensure a gain margin of the speed control system. The attenuator 328 is adapted to improve the phase characteristic. In the learning compensation circuit according to the eleventh embodiment employing no attenuator, only a phase lag of not more than ±90° is allowed at the most with respect to the object of limitation in a stable range of the speed control system as shown in FIG. 29, and this system is instabilized in shaping having a first or higher order delay element. In the twelfth embodiment of the present invention, on the other hand, a phase lag can be allowed up to ±150° when the attenuator 328 is set at a value of 0.5, for example, whereby the speed control system can be stabilized. A transfer function of the learning compensator 320 according to this embodiment is as follows:

$$G(s) = 1 / \left( 1 - KF(s) \sum_{i=1}^{n} K_i e^{-iSL} \right)$$

where K and F(s) represent transfer functions of the attenuator 328 and the filter 327 respectively.

Figure 31:
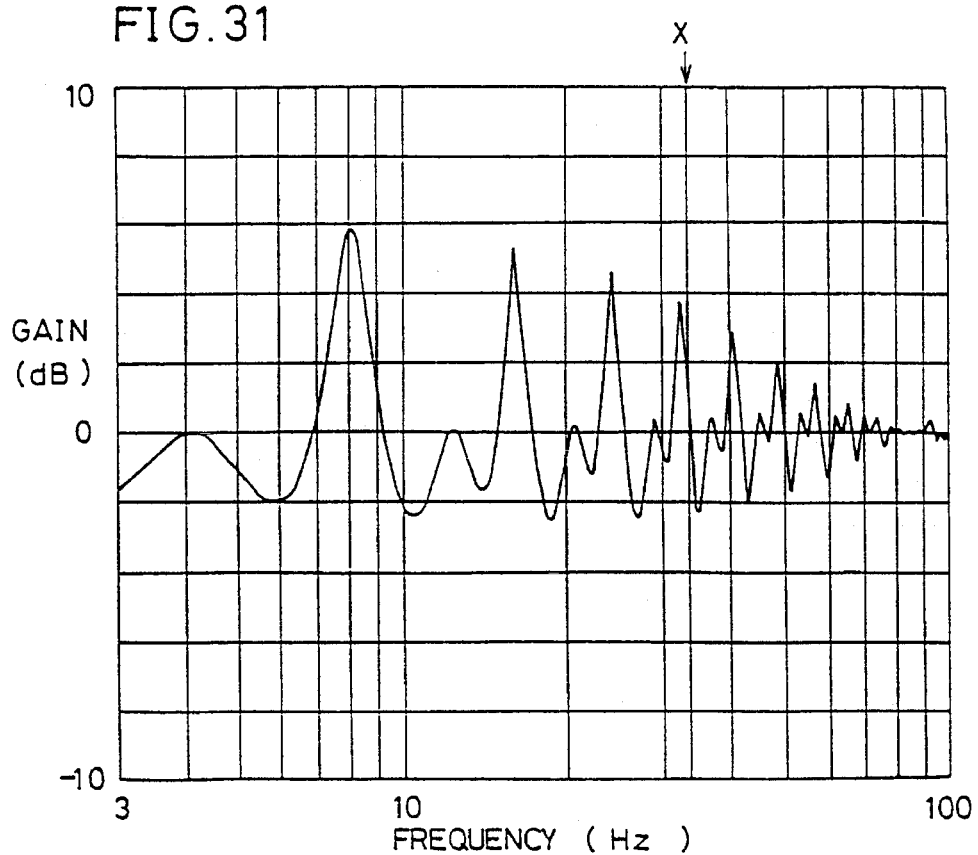
FIG. 31 illustrates transfer characteristics of a learning compensator provided in the embodiment shown in FIG. 30.

FIG. 31 illustrates the result of simulation as to transfer characteristics with the delay time L which is set at a frequency of 8.4 Hz, i.e., 10 times the rotational frequency (0.84 Hz) of the reel corresponding to BOT (beginning of tape), the filter 327 which is formed by a sampling holder (sampling frequency=84 Hz) and the attenuator 328 which is at a value of 0.5. The phase characteristic is improved and the gain is limited over a wide range as compared with FIG. 29. According to this embodiment having the aforementioned structure, it is possible to stabilize a control system having a first or higher order phase lag.

Figure 32:
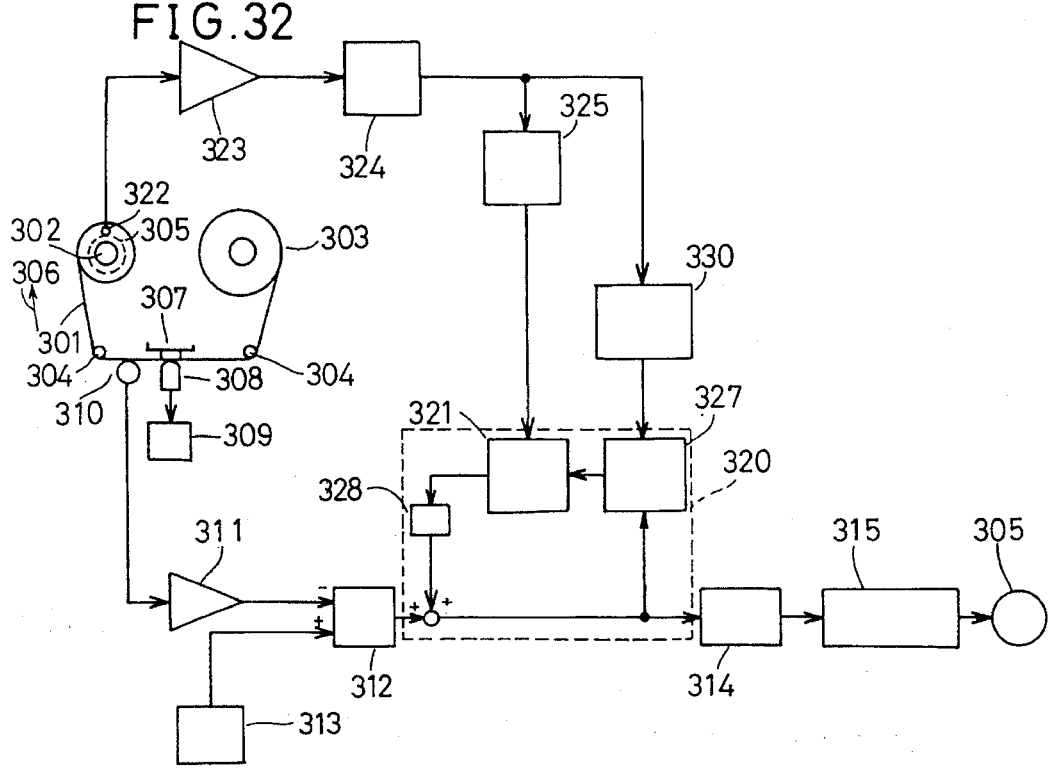
FIG. 32 is a block diagram showing a magnetic recording/reproducing apparatus according to a thirteenth embodiment of the present invention.

A thirteenth embodiment of the present invention is now described with reference to FIG. 32. In the magnetic recording/reproducing apparatus according to the thirteen embodiment, a learning compensator 320 is provided in a speed control loop while a filter 327 for band limitation and an attenuator 328 are provided in a loop of the learning compensator, similarly to the twelfth embodiment. The feature of this embodiment resides in that the time constant of the filter 327 for band limitation is rendered variable in response to the rotational frequency of a reel 302. Referring to FIG. 32, a filter constant operating circuit 330 is provided in the magnetic recording/reproducing apparatus according to this embodiment, in order to calculate a filter constant in response to an output value from a rotational frequency operating circuit 324. The filter constant is varied by the filter 327 for limiting the band of the learning compensator 320 in response to the value obtained in the filter constant operating circuit 330.

Due to the aforementioned structure, the filter 327 for limiting the band of the learning compensator 320 can vary the filter constant in response to the rotational frequency of the reel 302, whereby the reel 302 is rotated at a high speed and a motor torque ripple is generated at a high frequency at the BOT. Thus, it is possible to set a cutoff frequency of the filter 327 at a high value at the BOT. On the other hand, the reel 302 is rotated at a low speed and a motor torque ripple is generated at a low frequency at the EOT, whereby it is possible to set the cutoff frequency of the filter 327 at a low value. Thus, the constant of the filter 327 for the learning compensator 320 is regularly optimized over the BOT and the EOT.

A fourteenth embodiment of the present invention is now described with reference to FIG. 33. The magnetic recording/reproducing apparatus according to this embodiment is substantially similar in structure to the twelfth embodiment, except that a delay time L obtained from a delay time operating circuit 325 is multiplied by a correction coefficient Z, to be corrected.

Figure 33:
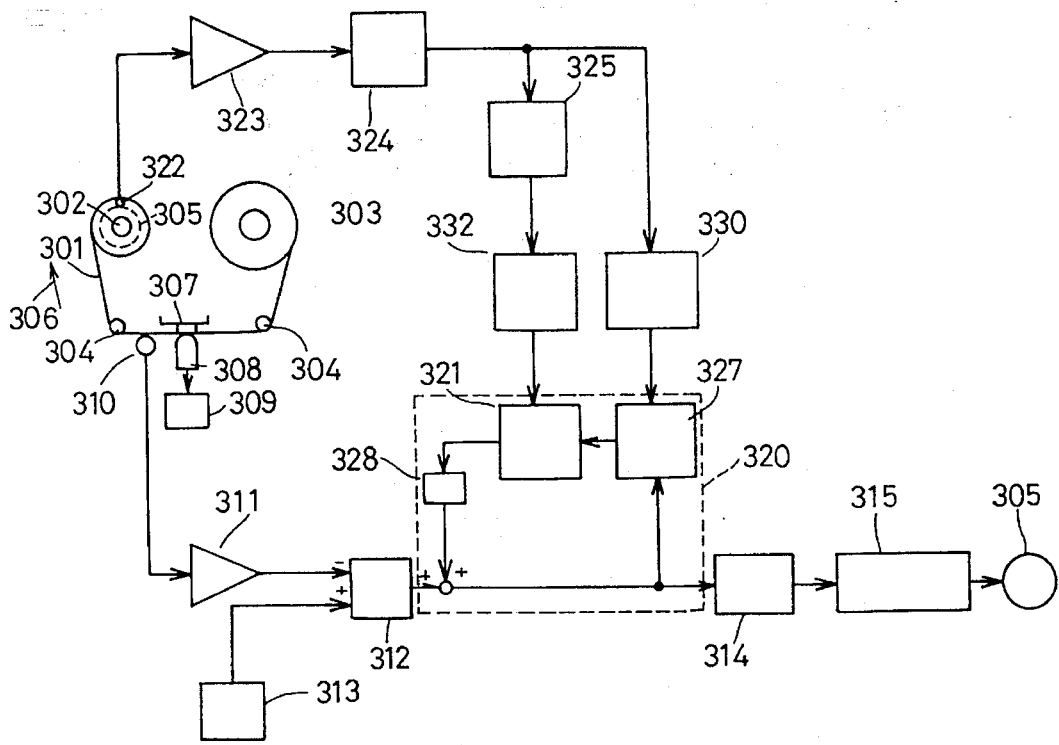
FIG. 33 is a block diagram showing a magnetic recording/reproducing apparatus according to a fourteenth embodiment of the present invention.

Referring to FIG. 33, the delay time L which is obtained in the delay time operating circuit 325 on the basis of the rotational frequency of a reel 302 is multiplied by the correction coefficient Z which is stored in a correction coefficient memory circuit 332, so that the delay time L is corrected.

The correction coefficient is now described. FIG. 31 shows the transfer characteristics of the learning compensator 320 provided in the twelfth embodiment. It is understood from FIG. 31 that the gain is increased at a frequency integral times that of the delay time L, i.e., a frequency corresponding to the motor torque ripple, in the transfer characteristics of the learning compensator 320. When the filter 327 for band limitation is provided in order to stabilize the control system as described above, this leads to deviation of the delay time L. For example, a position shown by arrow X in FIG. 31 represents a frequency corresponding to a quadruple component (33.6 Hz) of the delay time L (8.4 Hz), while the peak of the actual gain is shifted to a value lower than the position of arrow X. Although influence of such shifting causes no problem when the amount of shifting is small, the gain at the position of arrow X is considerably low in relation to large shifting as shown in FIG. 31, and no effect of the learning compensator 320 is attained in this state. This is because the filter 327 for band limitation is provided in the control loop of the learning compensator 320, the transfer characteristic of which is influenced by that of the filter 327 and shifted. Therefore, the amount of shifting exerts influence on the transfer characteristics of the filter 327 and the delay circuit 321, as a matter of course.

Figure 34:
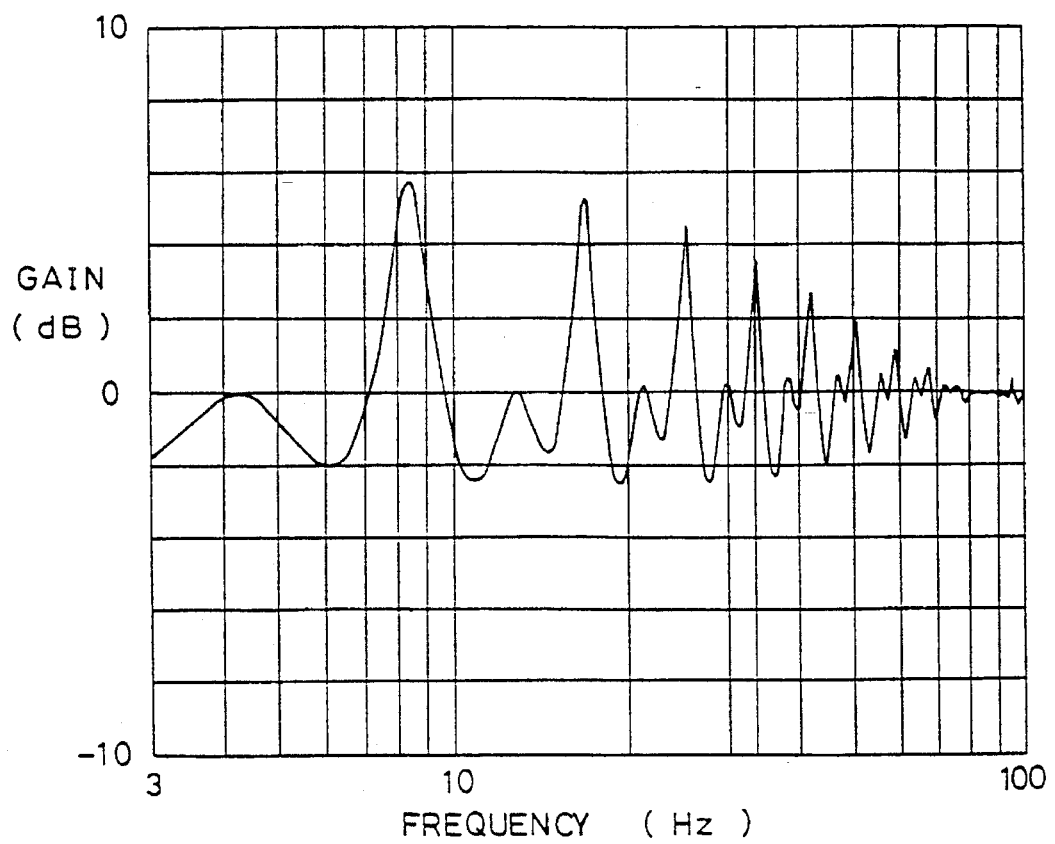
FIG. 34 illustrates transfer characteristics of a learning compensator provided in the embodiment shown in FIG. 33.

FIG. 34 shows the transfer characteristics of the learning compensator 320 with the correction coefficient memory circuit 332 storing a correction coefficient of 0.966. Thus, it is possible to correct the transfer characteristics of the learning compensator 320 so that the peak position of its gain is integral times the delay time L, whereby the original effect of the learning compensator 320 can be attained.

A fifteenth embodiment of the present invention is now described. Table 1 shows correction coefficients in the fourteenth embodiment obtained by simulation as to BOT and EOT. In this simulation, the filter 327 was formed by a sampling holder with a fixed sampling frequency, and the correction coefficients were obtained for respective multiplicity levels of the learning compensator 320.

TABLE 1

| Sampling Frequency | 50 Hz | | 100 Hz | | 200 Hz | |
|---|---|---|---|---|---|---|
| BOT or EOT | BOT | EOT | BOT | EOT | BOT | EOT |
| Multiplicity 1 | 0.92 | 0.95 | 0.96 | 0.98 | 0.98 | 0.99 |
| Multiplicity 2 | 0.95 | 0.98 | 0.98 | 0.99 | 0.99 | 0.99 |

As shown in Table 1, the correction coefficients were varied between the BOT and the EOT. Thus, it is understood necessary to vary the correction coefficients with the rotational frequency of the reel, in order to attain the optimum effect of the learning compensator over the BOT and the EOT.

Figure 35:
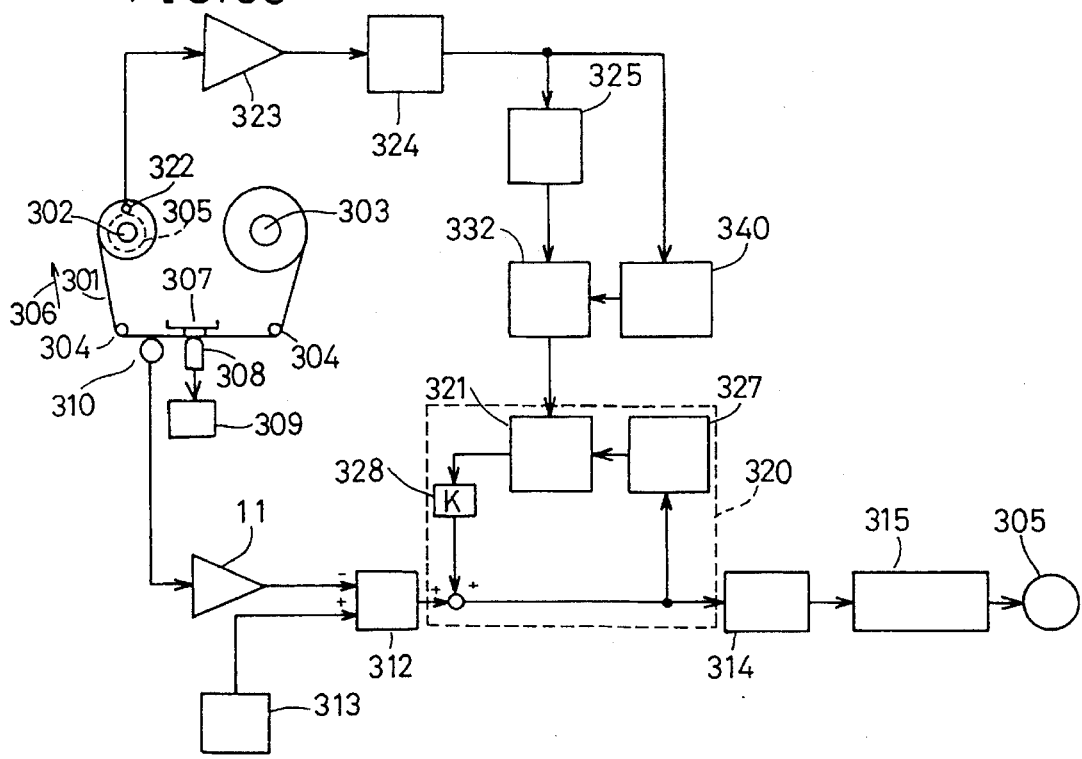
FIG. 35 is a block diagram showing a magnetic recording/reproducing apparatus according to a fifteenth embodiment of the present invention.

FIG. 35 is a block diagram showing a magnetic recording/reproducing apparatus according to the fifteenth embodiment. Referring to FIG. 35, this magnetic recording/reproducing apparatus comprises a correction coefficient operating circuit 340, which operates values of correction coefficients in response to output values of a rotational frequency operating circuit 324 or obtains such values from a correction coefficient table, such as the aforementioned Table 1, showing correction coefficients being previously calculated by simulation or the like. Due to this structure, it is possible to regularly obtain the optimum correction coefficients over the BOT and the EOT. Thus, a learning compensator 320 is regularly optimized so that it is possible to effectively reduce a torque ripple.

A sixteenth embodiment of the present invention is now described with reference to FIG. 36. Table 2 shows correction coefficients obtained by simulation for respective multiplicity levels of the learning compensator 320 in the fourteenth embodiment with a sampling holder having sampling periods of 1/10, 1/20 and 1/40 times the delay time L.

TABLE 2

| Sampling Period | L/10 | L/20 | L/30 | L/40 |
|---|---|---|---|---|
| Multiplicity 1 | 0.947 | 0.971 | 0.98 | 0.985 |
| Multiplicity 2 | 0.966 | 0.98 | 0.985 | 0.99 |
| Multiplicity 3 | 0.98 | 0.99 | 0.993 | 0.995 |

L: delay time
L/10: sampling period set at 1/10 times the delay time L

The results of simulation shown in Table 2 are effective under the aforementioned conditions. Therefore, the correction coefficients must be previously obtained by simulation or the like in response to the conditions. Thus, the correction coefficients are uniquely obtained when the sampling period is set at n times the delay time. Thus, it is possible to fix the values of the correction coefficients without depending on the delay time changing over the BOT and the EOT.

Figure 36:
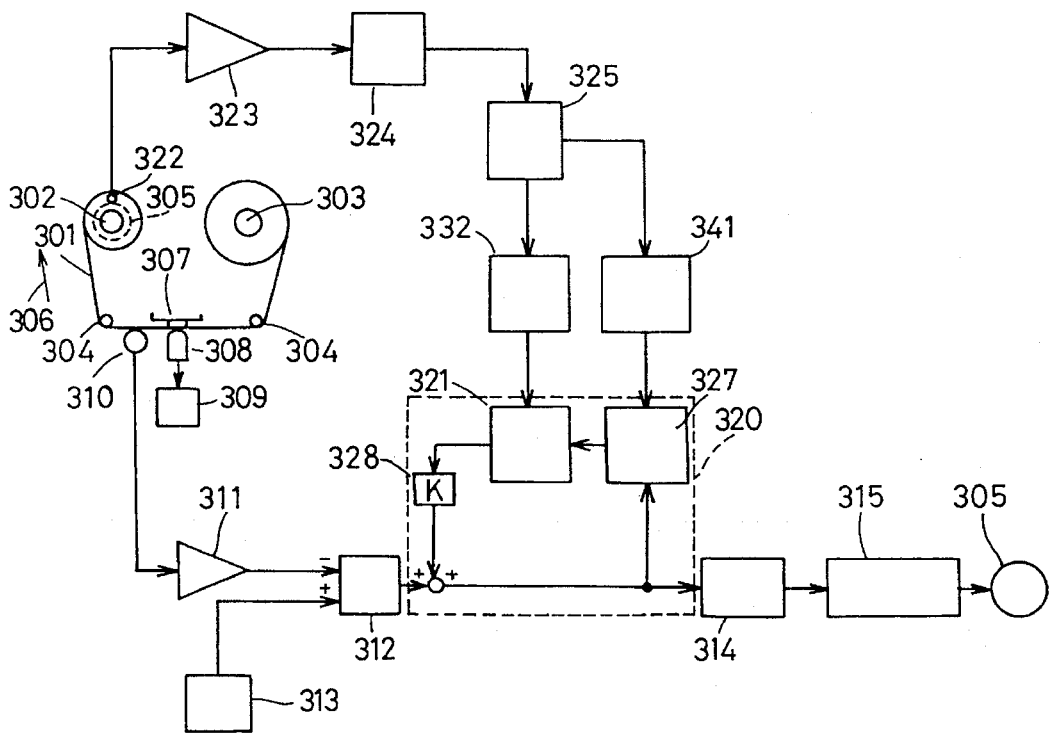
FIG. 36 is a block diagram showing a magnetic recording/reproducing apparatus according to a sixteenth embodiment of the present invention.

FIG. 36 is a block diagram showing a magnetic recording/reproducing apparatus according to the sixteenth embodiment of the present invention. Referring to FIG. 36, a filter constant operating circuit 341 operates a filter constant of a filter 327 in response to an output value of a delay time operating circuit 325 or obtains such a filter constant from a previously prepared table such as Table 2. When the filter 327 is formed by a sampling holder, for example, the sampling period of this sampling holder is set to be n times a delay time L obtained in the delay time operating circuit 325, as described above.

According to the magnetic recording/reproducing apparatus of this embodiment having the aforementioned structure, it is possible to fix a correction coefficient over the BOT and the EOT, thereby simplifying the circuit structure. Although the filter 327 is formed by a sampling holder in this embodiment, this filter 327 may be formed by any filter so far as its time constant is n times the delay time L.

Figure 37A:
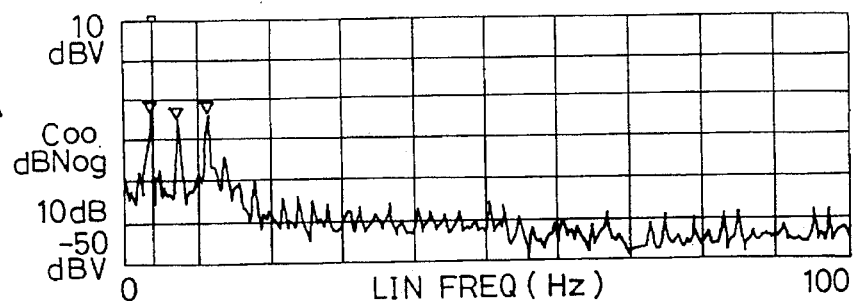
FIG. 37A illustrates the result of frequency analysis of wow and flutter by fast Fourier transform (FFT) during constant-speed travelling of a magnetic tape driven by a conventional reel motor.
Figure 37B:
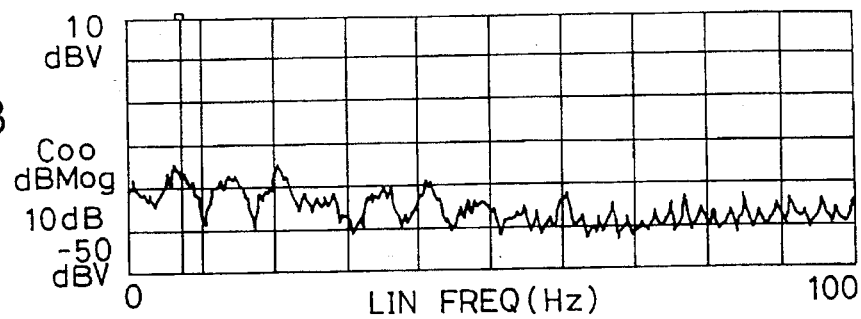
FIG. 37B illustrates the result of frequency analysis of wow and flutter by FFT in employment of the magnetic recording/reproducing apparatus according to the embodiment shown in FIG. 36.

FIGS. 37A and 37B illustrate operation results of wow and flutter meters in a conventional apparatus and the magnetic recording/reproducing apparatus according to this embodiment respectively, in order to indicate the effect of this embodiment. FIG. 37A shows the result of frequency analysis of wow and flutter by fast Fourier transform (FFT) upon completion of an operation for driving a magnetic tape at a constant speed by a conventional reel motor. FIG. 37B shows the result of frequency analysis of wow and flutter by fast Fourier transform in the magnetic recording/reproducing apparatus according to this embodiment. Referring to the result of frequency analysis shown in FIG. 37A, triangles show torque ripples. It is understood such torque ripples are reduced in the result of frequency analysis shown in FIG. 37B. Thus, it is understood possible to reduce wow and flutter by the magnetic recording/reproducing apparatus according to this embodiment.

A seventeenth embodiment of the present invention is now described with reference to FIGS. 38 and 39A to 39E. This embodiment is related to a driving system for canceling irregular motor torque.

Before describing this embodiment, the principle of correction of irregular rotation applied to this embodiment is now explained. Irregular torque $T_W$ is mostly formed by components having frequencies integral times the motor rotational frequency. Such irregular torque $T_W$ is Fourier-expanded as follows:

$$T_W = A1 \sin(\theta + \alpha 1) + A2 \sin(2\theta + \alpha 2) + \ldots + An \sin(n\theta + \alpha n) + \ldots$$

The components of the irregular torque $T_W$ expressed in the above equation are mainly caused by an installation error of a speed detecting frequency generator, irregular motor torque, load fluctuation of a motor bearing part and the like. When the first term in the above equation expresses a large component which is to be corrected, for example, a sine wave being out of phase with the component and having an amplitude K obtained by dividing the amplitude A1 of the component by a generated torque constant $K_t$ of the driving circuit and the motor is employed as a correction value $C_{j1}$ to be added to a speed command signal which is inputted in the motor driving circuit. When the correction value $C_{j1}$, which is equal to $-K\sin(\theta + \alpha 1)$, is inputted in the driving circuit, this correction value $C_{j1}$ is multiplied by the generated torque constant $K_t$, so that its motor torque T is as follows:

$$T = -A1 \sin(\theta + \alpha 1)$$

Hence, it is possible to eliminate the first term component from the aforementioned equation for the irregular torque $T_W$. In order to correct a plurality of components, on the other hand, correction values $C_{jn}$ may be obtained for the respective components, to be thereafter composed with each other.

According to the aforementioned principle of correction of irregular rotation, it is possible to correct a noted component by adjusting and setting only correction data of the component, while automatic adjustment can be easily carried out. Further, a circuit substrate may be reduced in size with a short adjusting time.

The seventeenth embodiment, to which the aforementioned principle of correction of irregular rotation is applied, is now described in more concrete terms.

Figure 45:
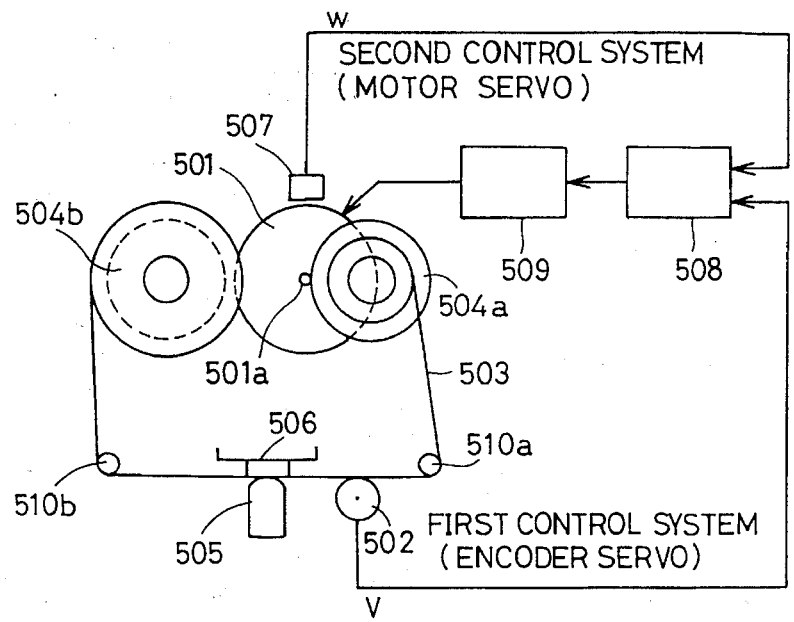
FIG. 45 schematically illustrates the structure of a magnetic recording/reproducing apparatus according to a twenty-second embodiment of the present invention.
Figure 49A:
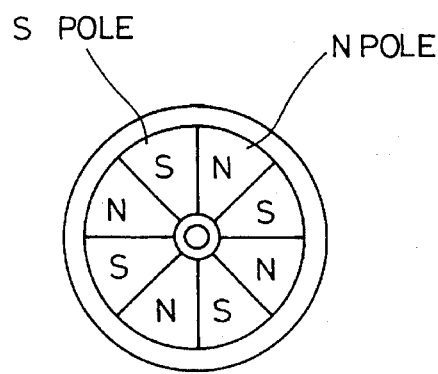
FIG. 49A illustrates an example of a rotor magnet of a three-phase brushless motor.
Figure 49B:
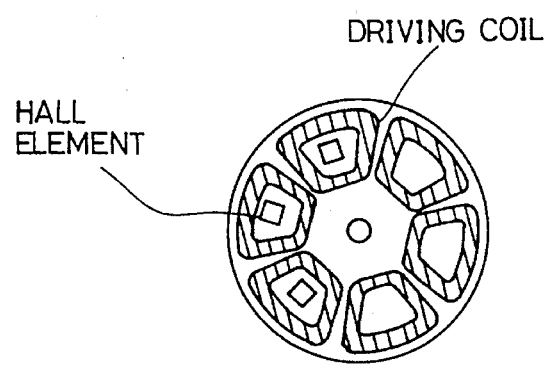
FIG. 49 illustrates an example of a stator driving coil.

Referring to a block diagram shown in FIG. 38, the magnetic recording/reproducing apparatus according to this embodiment comprises a motor 401 such as that shown in FIG. 49A or 49B, for example, a PG (pulse generator) 402 for detecting the rotational position of this motor 401, a PG waveform shaping circuit 403 for waveform-shaping a PG signal B received from the PG 402, an FG (frequency generator) 404 for detecting the rotational speed of the motor 401, and an FG waveform shaping circuit 405 for waveform-shaping an FG signal A received from the FG 404. The PG 402 and the FG 404 may be formed by Hall elements for driving the motor 401, or may be newly mounted on a motor rotor. The magnetic recording/reproducing apparatus according to this embodiment further comprises an FG address circuit 406 formed by a counter which is counted up with the FG signal A (see FIG. 39B) and reset at the value of a start address 407 with the PG signal B (see FIG. 39A), a memory circuit 408 which is formed by a ROM, for example, to store sine wave data for serving as ripple correction data, a gain circuit 409 which is formed by a multiplication type D-A converter receiving ripple correction data capable of varying the amplitude of a ripple correction signal C by a gain set value 410, an adder 411 for adding the ripple correction signal C with a speed command signal D of a circuit speed control circuit structured as shown in FIG. 45, for example, and a driving circuit 412 receiving an adder output E in its speed control terminal for rotating/driving the motor 401.

An operation of this embodiment for correcting irregular rotation which is twice the motor rotational frequency is now described for facilitating easy understanding of the present invention. While the motor 401 is rotated by the driving circuit 412, rotation fluctuation of a component twice the motor rotational frequency is caused as an irregular torque waveform F shown in FIG. 39E when no correction according to this embodiment is carried out. Due to the rotation of the motor 401, further, the FG and PG signals A and B have waveforms shown in FIGS. 39B and 39A respectively. The FG and PG signals A and B are inputted in the FG address circuit 406, which is formed by a counter being counted up with the FG signal A and reset at the value of the start address 407 by the PG signal B as described above, so that a count signal outputted from this FG address circuit 406 is inputted in the memory circuit 408. The memory circuit 408 stores correction data twice the motor rotational frequency, similarly to the irregular torque F. The memory circuit 408 outputs correction data in accordance with the count signal, so that the gain circuit 409 obtains the ripple correction signal C, which is an analog signal having an amplitude set by the gain set value 410. The start address 407 and the gain set value 410 are adjusted and set at such values that the ripple correction signal C is out of phase with the irregular torque F and has an amplitude obtained by dividing that of the irregular torque F by the generated torque constant $K_t$ in the driving circuit 412 and the motor 401 respectively. The ripple correction signal C is added with the speed command signal D by the adder 411, so that the adder output E is inputted in the driving circuit 412. The driving circuit 412 and the motor 401 multiply the adder output E by the generated torque constant $K_t$, to generate motor torque, such as correction motor torque G, which is out of phase with and identical in amplitude to the irregular torque F. This correction motor torque G cancels the irregular torque F, so that the component twice the rotational frequency is eliminated from corrected irregular torque H.

A start count number and the gain set value 410 can simply adjust the irregular torque with an oscilloscope or the like. Alternatively, it is possible to further simply adjust the irregular torque while observing the irregular torque component for correcting the same with an FFT (fast Fourier transform) analyzer.

Thus, according to the present invention, it is possible to eliminate irregular rotation which is integral times the motor rotational frequency. Since the ripple correction signal C is obtained from the FG and PG signals A and B, the circuits may not be re-adjusted but correction for eliminating irregular rotation can be properly carried out also when the motor is varied in rotational frequency.

Figure 40:
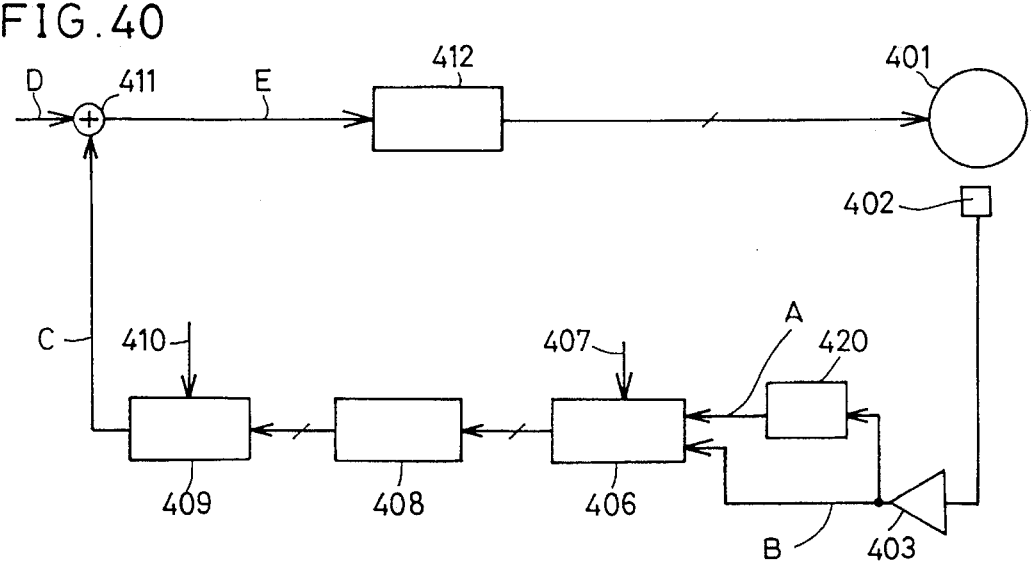
FIG. 40 is a block diagram showing a magnetic recording/reproducing apparatus according to an eighteenth embodiment of the present invention.

An eighteenth embodiment of the present invention is now described with reference to FIG. 40. In this embodiment, elements having the same functions or operations as those in the seventeenth embodiment are denoted by the same reference numerals, to omit redundant description.

The eighteenth embodiment of the present invention employs a motor having a similar effect to the seventeenth embodiment with no requirement for a frequency generator. Referring to FIG. 40, a PG signal B is inputted in a reset terminal of an FG address circuit 406 similarly to the seventeenth embodiment, as well as in a multiplication circuit 420. The multiplication circuit 420, which is formed by a PLL circuit, for example, outputs a pseudo FG signal A of n (n: integer of at least 2) times the PG signal B, and this pseudo FG signal A is inputted in a count-up terminal of the FG address circuit 406, similarly to the FG signal A in the seventeenth embodiment. An operation for correcting irregular torque F in this embodiment is similar to that of the seventeenth embodiment. According to this embodiment, it is possible to eliminate the irregular torque F with no requirement for a motor FG.

It is apprehended that the pseudo FG signal A is rendered inconstant by change in motor rotational frequency and the count output value of the FG address circuit 406 finely fluctuates every motor rotation. However, it is possible to suppress phase shift in a ripple correction signal C caused by such fluctuation of the count output value to an extremely small value by increasing the multiplication factor n of the multiplication circuit 420, so that the effect of correction remains unchanged. It is possible to increase the multiplication factor n simply by setting a circuit constant, with no trouble.

A nineteenth embodiment of the present invention is now described. This embodiment has a circuit structure which is similar to that shown in FIG. 38 or 40, and its operation for correction is also similar to that of the seventeenth or eighteenth embodiment.

Figure 41A:
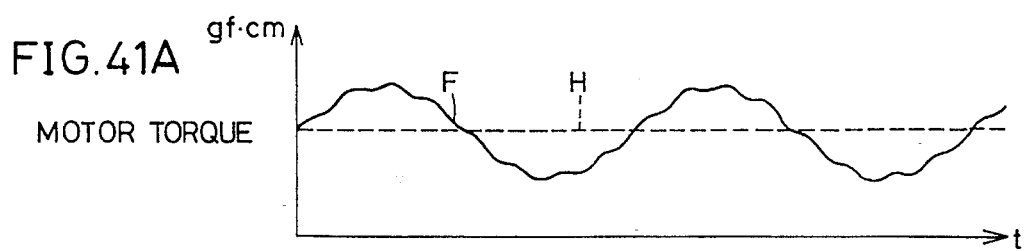
FIG. 41A illustrates fluctuation of an irregular torque component F in a nineteenth embodiment of the present invention.
Figure 41B:
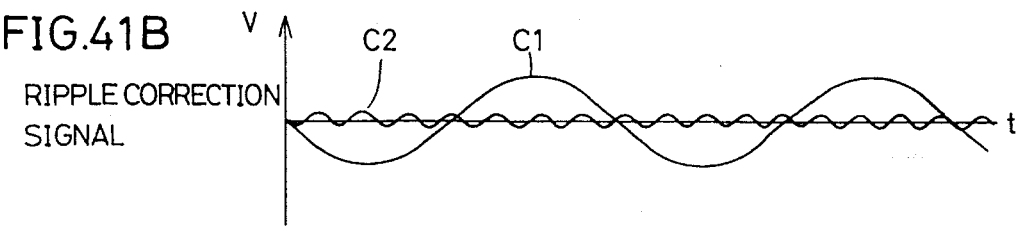
FIG. 41B illustrates ripple correction signals obtained for removing independent components of the irregular torque F.
Figure 41C:
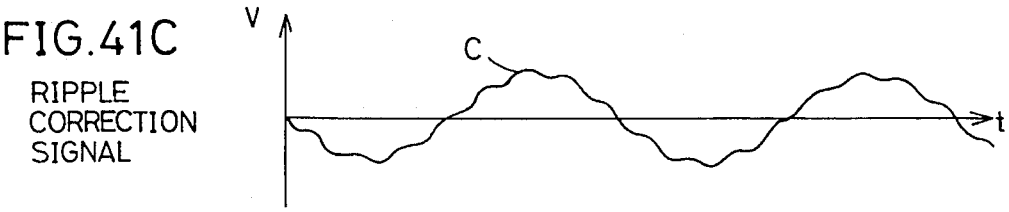
FIG. 41C illustrates a ripple correction signal obtained by correction data prepared by composing two irregular torque components.

This embodiment is adapted to simultaneously correct a plurality of components such as an irregular torque component F shown in FIG. 41A without increasing the number of circuits. In order to correct and eliminate two types of components such as the irregular torque F shown in FIG. 41A, for example, ripple correction signals such as C1 and C2 shown in FIG. 41B are obtained to first eliminate the independent components. Thereafter the two components are composed with each other to produce correction data, to be corrected by a ripple correction signal (see FIG. 41C) obtained from the correction data. Correction of the respective components and that by the composed correction data are carried out similarly to the seventeenth or eighteenth embodiment. The composed correction data can be easily produced by recording start count numbers and gain set values in correction of the respective components.

Although this embodiment is related to correction of two types of components, the present invention is not restricted to this but three or more types of components can also be simultaneously corrected.

A twentieth embodiment of the present invention is now described with reference to FIGS. 42 and 43A to 43C. In this embodiment, elements having similar functions and operations to those of the seventeenth embodiment are denoted by the same reference numerals as those in FIG. 38, to omit redundant description. In this embodiment, an operation for correction is similar to that of the seventeenth, eighteenth or nineteenth embodiment.

Figure 42:
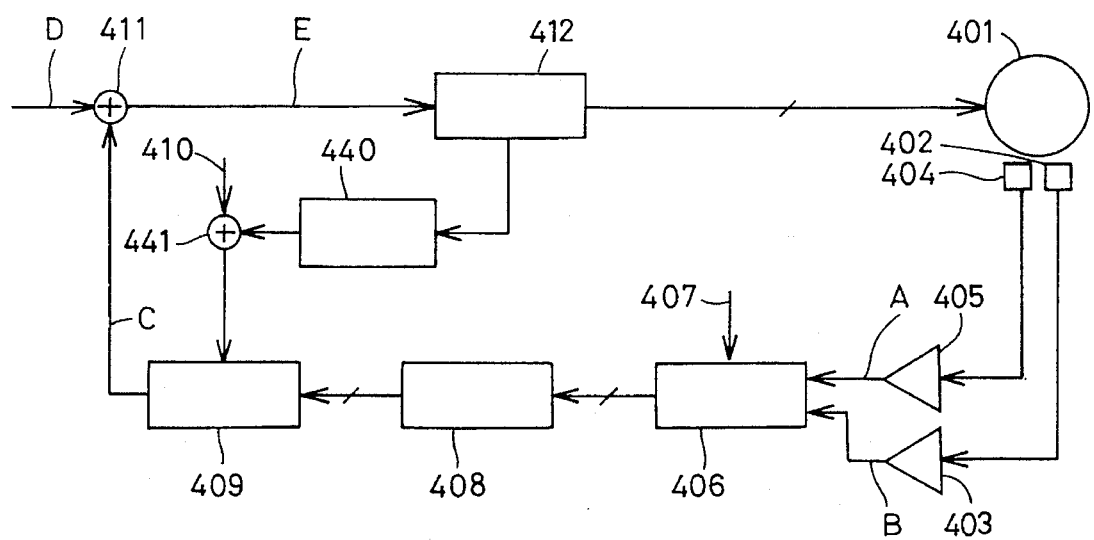
FIG. 42 is a block diagram showing a magnetic recording/reproducing apparatus according to a twentieth embodiment of the present invention.

Referring to FIG. 42, an adder 441 adds a gain set value 410 with a value which is proportionate to motor torque, such as a value obtained by eliminating a high-pass component from an output of a motor driving current detecting terminal of a driving circuit 412 by a low-pass filter 440, for example, and inputs the result in a gain circuit 409 in a motor rotational speed control unit provided in the magnetic recording/reproducing apparatus according to this embodiment.

Figure 43A:
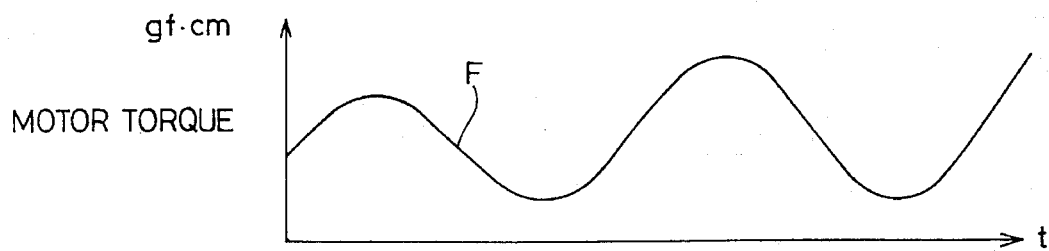
FIG. 43A illustrates motor torque fluctuation in the embodiment shown in FIG. 42.
Figure 43B:
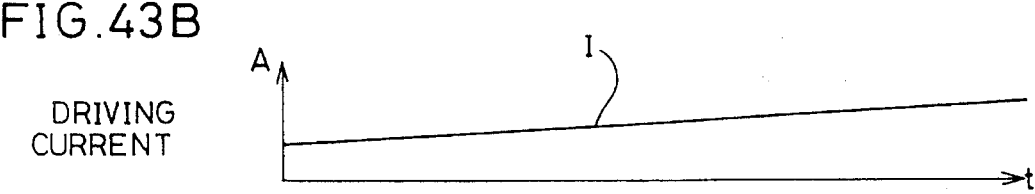
FIG. 43B illustrates change of a driving current.
Figure 43C:
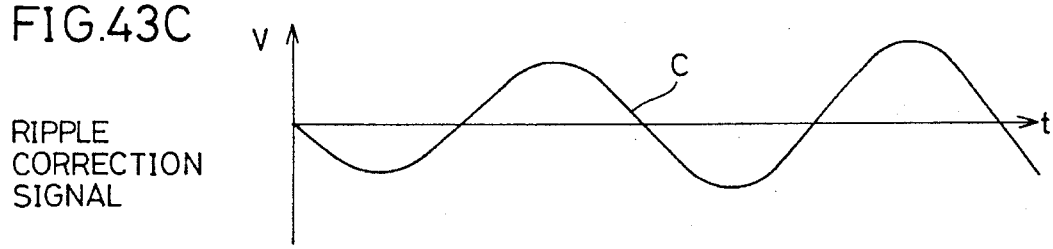
FIG. 43C illustrates fluctuation of a ripple correction signal.

When the motor torque is increased, irregular motor torque, for example, is also increased in general, and hence irregular rotation is inevitably increased as irregular torque F shown in FIG. 43A. When the gain circuit 409 is adapted to set a gain in proportion to a motor driving current I through the fact that the motor torque is proportionate to the motor driving current I, a signal such as a ripple correction signal C shown in FIG. 43C is obtained so that the irregular torque F can be eliminated by correction with this ripple correction signal C.

Thus, this embodiment is extremely effective in a situation with frequent fluctuation of motor torque. While the output signal from the motor driving current detecting terminal of the driving circuit 412 is utilized as motor torque in this embodiment, the present invention is not restricted to this but another output signal may alternatively be employed so far as this signal is proportionate to the motor torque.

Figure 44:
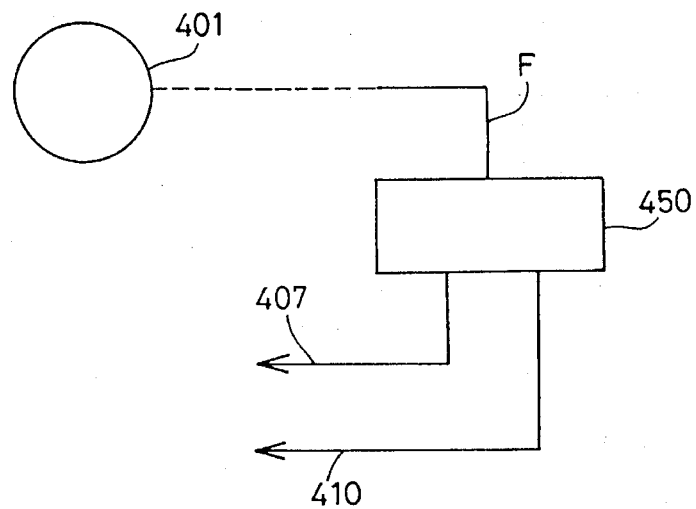
FIG. 44 is a block diagram showing a motor rotational speed control unit in a twenty-first embodiment of the present invention.

A twenty-first embodiment of the present invention is now described with reference to FIG. 44. Referring to FIG. 44, irregular motor torque F is inputted in a computing element 450 which is formed by a DSP or CPU in a motor rotational speed control unit according to this embodiment. This irregular motor torque F can be obtained from an FG signal A shown in FIG. 42, for example, and means for obtaining the irregular motor torque F is not particularly restricted in this embodiment. The computing element 450 obtains the value of a start address 407 and a gain set value 410 which are optimum for eliminating the irregular torque F by operations, and outputs the results. Signals as outputted are connected to the start address 407 and the gain set value 410 shown in FIG. 38, 40 or 42, so that an optimum ripple correction signal C is obtained to enable elimination of the irregular torque F.

Thus, according to this embodiment, it is possible to reliably eliminate irregular rotation even if the irregular rotation component frequently fluctuates by time change of a motor or the like.

A twenty-second embodiment of the present invention is now described with reference to FIGS. 45 to 47A and 47B. This embodiment is related to a magnetic recording/reproducing apparatus for detecting the travelling speed of a magnetic tape with a speed detecting roller and controlling constant-speed travelling of the magnetic tape, which is provided with a double control loop including a first control system for servo-controlling by means of an encoder mounted on a speed detecting roller and a second control system for servo-controlling a reel drive motor for a take-up reel.

In the magnetic recording/reproducing apparatus shown in FIG. 45, a speed detecting roller 502 serving as speed detecting means detects speed information v of a magnetic tape 503. Speed reduction rims 504a and 504b, whose outer peripheral surfaces are pressed against a motor rotational shaft 501a, are mounted on take-up and supply reels for transmitting motor torque to the reels. Information recorded on the magnetic tape 503 is recorded/reproduced by a magnetic head 505, against which the magnetic tape 503 is pressed by a pressure pad 506. A rotation detector 507 detects motor rotation information ω. A speed control part 508 generates a control signal on the basis of the tape speed information v and the motor rotation information ω. A motor 501 is driven by a motor driving part 509, while travelling of the magnetic tape 503 is guided by tape guides 510a and 510b.

The torque of the motor 501 is transmitted to the take-up reduction rim 504a to rotate the take-up reel, thereby facilitating travelling of the magnetic tape 503. The outer peripheral surface of the speed detecting roller 502 is in contact with the magnetic tape 503 at a prescribed contact angle, so that the speed detecting roller 502 is rotated along travelling of the magnetic tape 503. Thus, roller rotation information detected from a speed detecting pattern (not shown) provided on the speed detecting roller 502 can be regarded as the tape speed information v, which in turn is inputted in the speed control part 508. Rotation of the motor 501 is detected from a rotation detecting pattern (not shown) provided on a motor rotor by the rotation detector 507, so that the motor rotation information ω is inputted in the speed control part 508. The speed control part 508 generates a control signal for conserving the tape speed as described later, and outputs the same to the motor driving part 509. The motor driving part 509 rotates the motor 501 in response to the control signal.

Due to the aforementioned structure, the travelling speed of the magnetic tape 503 is controlled to be constant in this embodiment. It is possible to easily reciprocate the magnetic tape 503 in an auto reverse manner with a single motor by simply changing the pressure contact direction of the motor, due to the speed reduction rims 504a and 504b provided on the take-up and supply reels as shown in FIG. 45.

Figure 46:
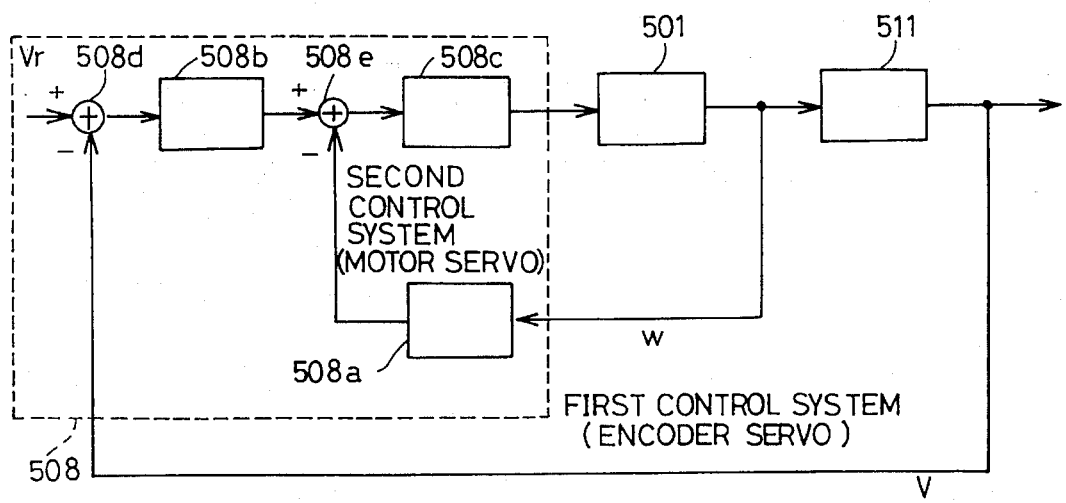
FIG. 46 is a block diagram showing a speed control part provided in the embodiment shown in FIG. 45.

The structure of the speed control part 508 provided in this embodiment is now described with reference to a block diagram shown in FIG. 46. In the control system of this embodiment, the motor 501 is connected with mechanism delay elements which exert influence on the control system for the speed reduction rim 504a, the magnetic tape 503, the speed detecting roller 502 and the like. The speed control part 508 has a motor information processing part 508a for performing waveform processing such as filtering and amplification on the motor rotation information ω, a tape information processing part 508b for performing waveform processing such as filtering and amplification on a speed error of an adder 508d which compares the magnetic tape speed v with a reference speed $v_r$, an adder 508e for comparing a control signal formed by the as-processed speed error with the processed rotation information ω and outputting a rotation error, and an amplification part 508c for amplifying the rotation error. The motor 501 is driven in proportion to the control signal outputted from the amplification part 508c. The motor driving part 509 having a gain of 1 in FIG. 45 is omitted from FIG. 46.

Thus, the speed control part 508 is formed by a double control loop including a first control system (hereinafter referred to as "encoder servo system") which feeds back the speed information of the speed detecting roller 502 and controls the tape speed v constant toward a target of the reference speed $v_r$ and a second control system (hereinafter referred to as "motor servo system") which feeds back the rotation information ω of the rotation detector 507 for the motor and controls the motor rotational frequency so that the tape speed v is constant with a target of the control signal in the first control system.

Reduction of a detecting period for the speed information can be regarded as a factor for implementing a high-accuracy speed control system for the motor, i.e., a control system following up to a high frequency. This embodiment having a double feedback loop structure is so formed that the encoder servo system by the speed detecting roller 502 is applied to a low frequency band and the motor servo system by the rotation detector 507 is applied to a high frequency band.

The low frequency band ranges from 0 Hz (DC) to about 10 Hz, for example, and speed information in such a low frequency band may be sampled at about 30 Hz in consideration of a sampling theorem or the like. Assuming that the tape speed v is 47.6 mm/s, for example, speed information is about 34.6 Hz if the speed detecting roller 502 has an outer diameter and a detecting pattern diameter of 7 mm and a pattern number of 16 ppr. Therefore, it is understood that speed information can be sufficiently detected with such a small outer diameter and a small pattern number. Thus, the detecting period of the speed detecting roller 502 may not be particularly reduced, whereby it is not necessary to narrow the pitch of the speed detecting pattern while the roller diameter may not be increased to increase the pattern number. Further, it is not necessary to reduce the outer diameter of the speed detecting roller 502 and increase the tape contact angle for increasing the rotational speed of this roller 502, whereby the roller 502 can be reduced in size and cost, to implement reduction in size and cost of the apparatus.

In the motor servo system applied to a high frequency band (at least 5 to 10 Hz), the rotation detecting means for the motor 501 must detect the rotation information in a short sampling period. When a flat motor which is advantageous for reducing the apparatus in thickness is employed, for example, the outer diameter of the motor rotor must be about 30 mm in general, in consideration of high-speed travelling (fast forwarding) of the tape and the like. When a rotation detecting pattern which is mounted on or stuck onto this motor rotor also has a diameter of up to about 30 mm, i.e., the same size as the motor rotor, it is possible to easily increase the pattern number while exerting no influence on the outer diameter of the motor. The motor rotational frequency, which is transmitted to the reel with speed reduction by the speed reduction rim 504a, is increased as "reel rotational frequency × speed reduction factor", whereby the rotation information can be detected in a short period. Thus, the apparatus can be advantageously reduced in size and cost.

Figure 47A:
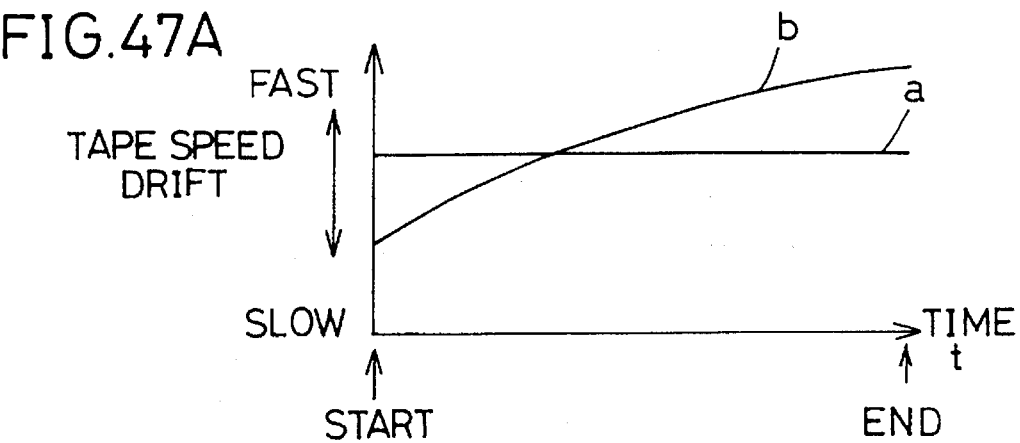
FIG. 47A is a tape speed drift characteristic diagram with a high encoder servo gain in the twenty-second embodiment shown in FIG. 45.
Figure 47B:
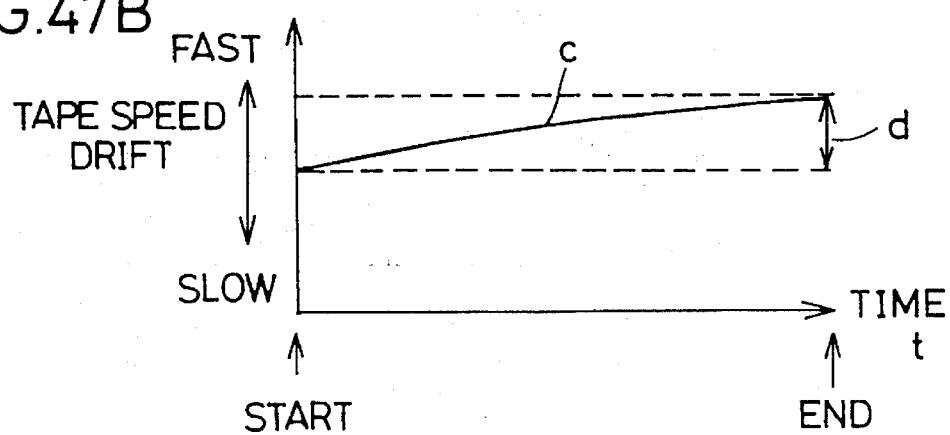
FIG. 47B is a tape speed drift characteristic diagram with tolerance for a speed drift utilized to the maximum in this embodiment.
Figure 48:
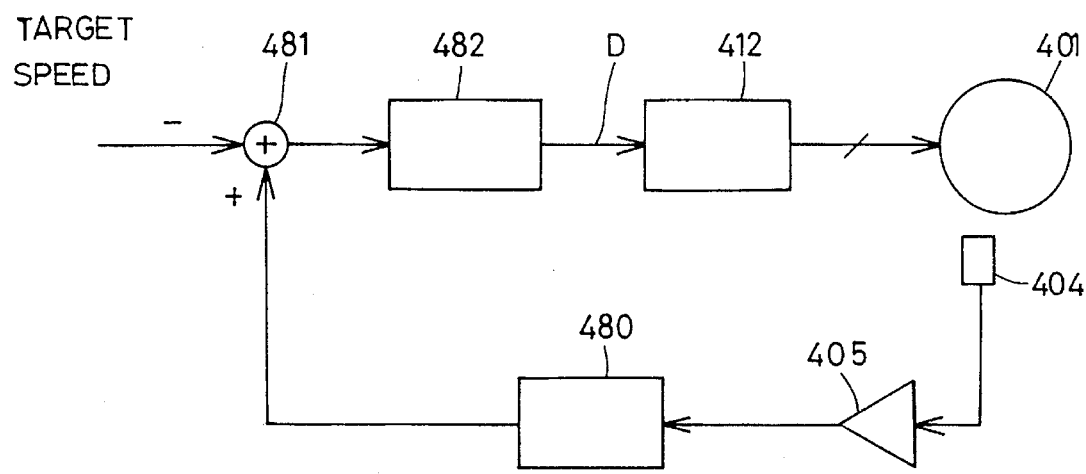
FIG. 48 is a block diagram showing a motor rotational speed control unit in a conventional magnetic recording/reproducing apparatus.

Distribution of a servo gain with respect to the two control systems provided in this embodiment is now described. FIGS. 47A and 47B illustrate tape speed drift characteristics with tape travelling times t shown on the axes of abscissas and tape speed drifts shown on the axes of ordinates. FIG. 47A shows the tape speed drift characteristic related to a large encoder servo gain, and FIG. 47B shows that related to tolerance for a speed drift utilized to the maximum. In the servo gain in the overall double control system including encoder and motor servo systems, gain and phase margins in transfer function characteristics may be at proper values which are generally appreciated. When gain distribution for the encoder servo system is increased, the tape speed drift is as shown by a in FIG. 47A, and a drift component is reduced. However, since the encoder servo system merely follows up to a low frequency band, fluctuation in tape speed in the range of at least 5 to 10 Hz, i.e., the so-called wow and flutter component, is increased. When gain distribution for the motor servo system is increased, on the other hand, the motor is controlled to be rotated at a constant speed, whereby the tape speed is varied with change in roll diameter of the tape and the drift component is increased as shown by b in FIG. 47A. However, it is possible to reduce the wow and flutter component since this system can follow up to a high frequency band. Considering the above circumstances, it is most effective to set gain distribution for the two control systems so that the speed drift is as shown by c in FIG. 47B utilizing tolerance d for the speed drift to the maximum. The current servo gain in the overall control system is at a proper value in the transfer function characteristics as described above, as a matter of course. The tolerance d for the speed drift means tolerance for the apparatus, or a phase lock range when phase control is added to the encoder servo system. When integral control is added to the encoder servo system, on the other hand, the tolerance d means that causing no saturation of an integral error voltage with consideration of safety which is decided by the state of employment and the like.

As to speed detecting means, it is also possible to employ a method of reading speed information from a magnetic tape by a speed detecting head. Also in this case, speed control is carried out in a structure similar to the above, so that speed information of only a low frequency may be detected similarly to the above. Thus, a noise countermeasure is simplified while a burden on a signal processing part can be reduced since data are at long intervals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording/reproducing apparatus for recording and/or reproducing information in and/or from a magnetic tape with a magnetic head, said magnetic recording/reproducing apparatus comprising:

speed detecting means for a travelling magnetic tape;

reel driving means for a take-up reel; and control means for controlling the rotational speed of said reel driving means for said take-up reel, on the basis of speed information obtained by said tape speed detecting means, said control means controlling the rotational speed of said reel driving means for said take-up reel, on the basis of said speed information obtained by said magnetic tape speed detecting means, thereby controlling the travelling speed of said magnetic tape, means for maintaining the frequency of resonance, appearing due to total equivalent inertia moment related to said magnetic tape and said take-up reel and that related to a supply reel, higher than the frequency of antiresonance appearing due to total equivalent inertia moment related to said magnetic tape and said supply reel between a start and an end of an operation for winding said magnetic tape on said take-up reel in recording/reproduction.

2. A magnetic recording/reproducing apparatus in accordance with claim 1, wherein assuming that $J_T$ represents equivalent inertia moment of said take-up reel driving means, speed reduction means being driven by said take-up reel driving means, a take-up reel base, said take-up reel, and a magnetic tape roll, being wound on said take-up reel, about the rotation axis of said take-up reel, $R_T$ represents the roll radius of said magnetic tape being wound on said take-up reel, $K_T$ represents the longitudinal spring constant of a portion of said magnetic tape located between a contact surface with said magnetic head and said take-up reel, $J_S$ represents equivalent inertia moment of a supply reel base, said supply reel and a magnetic tape roll being wound on said supply reel about the rotation axis of said supply reel, Rs represents the roll radius of said magnetic tape being wound on said supply reel, and $K_S$ represents the longitudinal spring constant of a portion of said magnetic tape being located between said contact surface with said magnetic head and said supply reel, the following relation holds between said start and said end of said operation for winding said magnetic tape on said take-up reel in recording/reproduction:

$$K_S \cdot R_S^2/J_S \leq K_S \cdot K_T/(K_S+K_T) \cdot (R_S^2/J_S+R_T^2/J_T)$$

3. A magnetic recording/reproducing apparatus in accordance with claim 1, wherein said reel driving means has a speed reduction mechanism, and a motor for rotating/driving said take-up reel through said speed reduction mechanism.

4. A magnetic recording/reproducing apparatus in accordance with claim 3, wherein said tape speed detecting means provides recording and reproducing gaps on upstream and downstream sides of the travelling direction of said magnetic tape at a prescribed distance for measuring a time required for recording a speed detection signal in said magnetic tape with said recording gap and detecting said signal with said reproducing gap, thereby detecting the tape speed on the basis of the result of such measurement.

5. A magnetic recording/reproducing apparatus in accordance with claim 4, wherein said recording and reproducing gaps are provided in the same head.

6. A magnetic recording/reproducing apparatus in accordance with claim 4, wherein two equivalent magnetic gaps being provided in the same head serve as recording or reproducing gaps by switching between recording and reproducing circuits.

7. A magnetic recording/reproducing apparatus in accordance with claim 3, wherein said tape speed detecting means includes a roller being in contact with said magnetic tape to be rotated following travelling of said magnetic tape, means for detecting the rotational speed of said roller, and means for calculating the travelling speed of said magnetic tape from said rotational speed of said roller.

8. A magnetic recording/reproducing apparatus in accordance with claim 7, wherein said tape speed detecting means further includes means for detecting the rotational speed of a reel on which said tape is wound, and means for calculating the travelling speed of said magnetic tape using both of rotational speed information of said roller and that of said reel.

9. A magnetic recording/reproducing apparatus in accordance with claim 3, wherein said speed reduction mechanism includes a worm gear.

10. A magnetic recording/reproducing apparatus in accordance with claim 3, wherein said speed reduction mechanism includes a discoidal member being mounted on a rotation axis of said take-up reel, and means for frictionally transmitting rotational driving force of said motor to said discoidal member.

11. A magnetic recording/reproducing apparatus in accordance with claim 3, wherein said control means includes a motor rotational speed control circuit comprising m (m: integer of at least 1) rotational position detectors and m by n (n: integer of at least 2) rotational speed detectors in single rotation for controlling the rotational speed of said motor, said motor rotational speed control circuit further comprising:

memory means storing a single type of sine wave or a composite wave made by adding up a plurality of sine waves having a frequency of integral times the motor rotational frequency as ripple correction data, address means for obtaining a rotational speed detector address signal whose start address can be arbitrarily set by said rotational position detectors and said rotational speed detectors, and gain means for setting the amplitude of said ripple correction data and outputting a ripple correction signal, said sine wave or said composite wave for forming ripple correction data corresponding to said rotational speed detector address signal obtained from said address means being read from said memory means and inputted in said gain means for producing a ripple correction signal with a set amplitude, so that said ripple correction signal is added to a control signal for controlling the rotational speed.

\* \* \* \* \*